United States Patent [19]
Shitara

[11] Patent Number: 5,999,354
[45] Date of Patent: Dec. 7, 1999

[54] METHOD AND APPARATUS FOR RECORDING/REPRODUCING DIGITAL DATA AND HEADER INFORMATION TO/FROM AREAS OF A TAPE RECORD MEDIUM

[75] Inventor: Teruyuki Shitara, Tokyo, Japan

[73] Assignee: Sony Corporation, Tokyo, Japan

[21] Appl. No.: 08/765,090

[22] PCT Filed: May 1, 1996

[86] PCT No.: PCT/JP96/01196

§ 371 Date: Dec. 20, 1996

§ 102(e) Date: Dec. 20, 1996

[87] PCT Pub. No.: WO96/35209

PCT Pub. Date: Nov. 7, 1996

[30] Foreign Application Priority Data

May 2, 1995 [JP] Japan .................................. 7-132864

[51] Int. Cl.⁶ ............................................. G11B 5/09
[52] U.S. Cl. ................................................. 360/53; 360/48
[58] Field of Search ....................... 360/48, 53; 371/47.1

[56] References Cited

U.S. PATENT DOCUMENTS

| | | | |
|---|---|---|---|
| 4,734,901 | 3/1988 | Murakami | 369/59 |
| 5,255,270 | 10/1993 | Yanai et al. | 360/53 |
| 5,434,719 | 7/1995 | Miller et al. | 360/53 |
| 5,543,977 | 8/1996 | Shih et al. | 360/48 |
| 5,589,995 | 12/1996 | Saito et al. | 360/48 |
| 5,796,690 | 8/1990 | Kanno | 369/48 |

*Primary Examiner*—Aristotelis M. Psitos
*Assistant Examiner*—Regina Y. Neal
*Attorney, Agent, or Firm*—Frommer Lawrence & Haug, LLP; William S. Frommer; Dennis M. Smid

[57] ABSTRACT

Even if a read error of data in a tape management area takes place due to a scratch on the tape, the management area data can be securely restored by the retry process.

Assume that the initial value of the physical ID is equivalent to 4000ID that is the distance measured from the PBOT. After the normal write process for the VSIT is performed, the initial value of the physical ID becomes −1600ID (see FIG. 19A). After the first write retry process has been performed, the initial value of the physical ID becomes −1700ID (see FIG. 19B). After the first write retry process has been performed, the initial value of the physical ID becomes −1800ID (see FIG. 19C). Thus, whenever the retry process is performed, the initial value of the physical ID is decreased for 100ID. On the other hand, the VSIT is written from 0ID. In the retry process for the VSIT, the physical ID of the start position is not changed. However, the real write position (namely, the distance measured from the start position) is changed. Thus, even if the write data of the VSIT has an error due to for example a scratch on the tape, the write error of the VSIT can be recovered by the retry process.

14 Claims, 29 Drawing Sheets

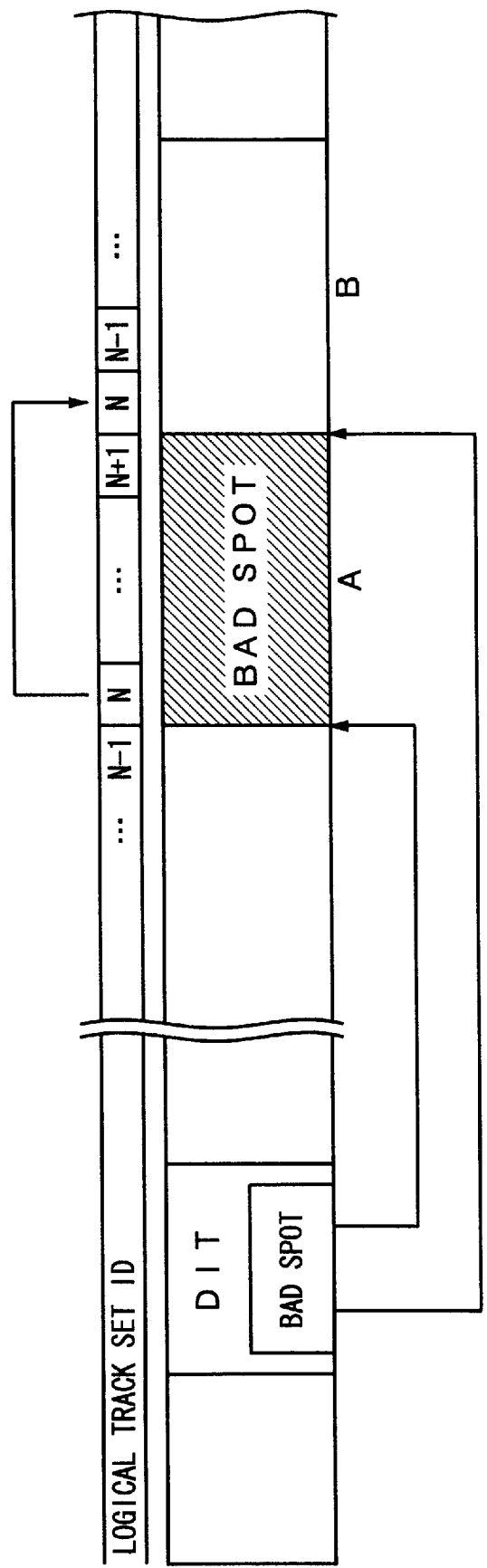

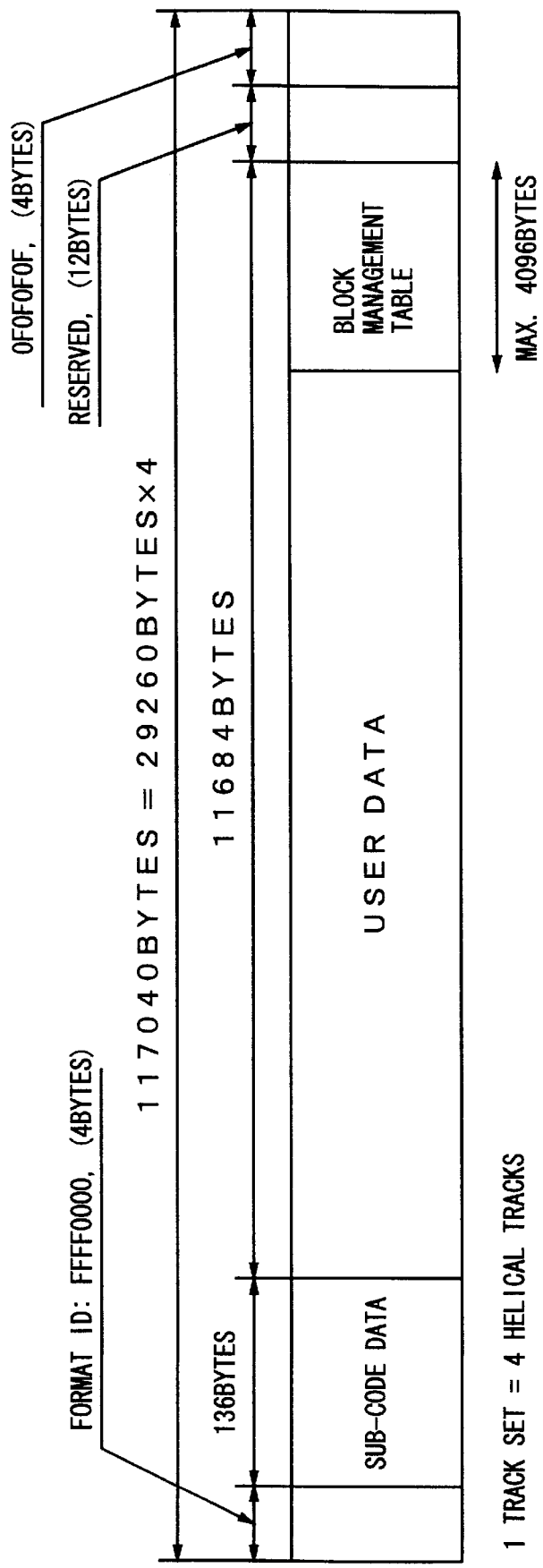

25: ROTATING HEAD
46: SYSTEM CONTROLLER
61: MAIN MEMORY
70: TWO-PORT MEMORY
71: RAM
80: BANK MEMORY
81: SUB CPU
87: RS422 INTERFACE

METHOD AND APPARATUS FOR RECORDING/REPRODUCING DIGITAL DATA AND HEADER INFORMATION TO/FROM AREAS OF A TAPE RECORD MEDIUM

This application is the National Stage of International Application No. PCT/IP96/01196 filed May 1, 1996.

TECHNICAL FIELD

The present invention relates to a data recording apparatus for sequentially recording a large amount of data, in particular, a data recording apparatus for recording such data on a magnetic tape with a helical scan head.

BACKGROUND ART

At present, as the amount of data to be handled increases, the necessity for a data recording apparatus that records data on a magnetic tape as a means for storing a large amount of data is becoming strong. On a record medium that uses such a magnetic tape, unlike with a disc type record medium, data is almost sequentially recorded.

At this point, longitudinal tracks are formed at the upper and lower portions in the width direction of the tape. Between the upper and lower longitudinal tracks, helical tracks are formed so as to effectively use the magnetic tape. The helical tracks are formed by a helical scan head in such a manner that a head mounted on a rotating drum is rotated with an angle to the traveling direction of the tape.

The upper longitudinal track is a control track for recording control pulses. On the other hand, the lower longitudinal track is a time code track for recording time codes. The time code represents the longitudinal position of the tape (namely, the physical ID of the tape). For example, the time code is recorded on every twelfth helical track. When the apparatus reads a time code, it can detect the current position of the head. As an example of the time code, SMPTE time code is used.

A magnetic tape of very large capacity type such as 42 Gbyte type is used. Thus, the magnetic tape is normally used with a plurality of separated areas. The separated areas are normally referred to as partitions or volumes. At the beginning of each partition, header information that represents the beginning thereof is written. With the partitions, one tape can be used as a plurality of tapes.

When the magnetic tape is initialized or the above-described partitions are formed thereon, data areas for managing the contents recorded on the tape are formed. For example, a VSIT (Volume Set Information Table) that is an area for managing information of partitions recorded on the tape and a DIT (Directory Information Table) that is an area for managing the partitions. These areas are important for managing data on the entire tape.

Thus, when data particularly in the VSIT area is lost, the data on the tape may not be used again. In addition, even if data can be restored from such a tape, since all the data recorded on the tape should be read, it will take a very long time. Thus, if an error takes place while writing or reading data to/from these areas, a write/read retry process should be required.

In the management information such as the VSIT and DIT, the VSIT for recording the management information of the entire tape is read just after the tape is loaded to the data recorder. Thus, the VSIT should have been recorded at a predetermined position of the start portion of the tape. In other words, the VSIT should have been recorded at a predetermined physical ID position. Thus, when a read error of the VSIT takes place and the read process is retried, the VSIT is written to the position of the physical ID where the error has taken place. In addition, as to the DIT, if the write process is retried, the DIT is written to the position of the physical ID where the error has taken place.

If an error takes place while reading data from the tape, although many causes can be considered, the error may take place due to a physical damage on the tape (for example, a scratch on the tape). When the VSIT and DIT are rewritten to the positions where an error has taken place, as with the related art reference, the same error will sometimes take place.

In addition, even if the VSIT and DIT have been successfully written, they may not be correctly read.

DISCLOSURE OF THE INVENTION

Therefore, an object of the present invention is to provide a data recorder that can securely perform a retry process for securely restoring data of the management areas even if an error takes place in the data thereof due to for example a scratch on the tape.

To solve the above-described problem, the present invention is a digital data recording/reproducing apparatus for recording/reproducing digital data and header information to/from a data area and a header areas as a plurality of divided areas of a tape shaped record medium with a recording/reproducing head, comprising a memory means for storing the header information to be recorded on the tape shaped record medium, an error determining means for determining whether or not an error takes place when the header information stored in said memory means is recorded in the header area of the tape shaped record medium and outputting an error occurrence signal when the error takes place, and a controlling means for changing the position at which the header information is recorded on the tape shaped record medium when the error occurrence signal is input from said error determining means.

The present invention is a digital data recording/reproducing method for recording/reproducing digital data and header information to/from a data area and a header areas as a plurality of divided areas of a tape shaped record medium with a recording/reproducing head, comprising the steps of (1) storing the header information to be recorded on the tape shaped record medium, (2) determining whether or not an error takes place when the header information stored in the step (1) is recorded in the header area of the tape shaped record medium and outputting an error occurrence signal when the error takes place, and (3) changing the position at which the header information is recorded on the tape shaped record medium when the error occurrence signal is input in the step (2).

The present invention is a digital recording/reproducing method for recording/reproducing digital data and dummy data/header information to/from a data area and a dummy data as a plurality of divided data areas of a tape shaped record medium, comprising the steps of (1) recording the dummy data to the header area of the tape shaped record medium, (2) counting the number of times of a process for recording the header information to the tape shaped record medium, (3) reproducing the header information that has been recorded with the recording/reproducing head and comparing the recorded data with the reproduced data so as to determine whether the header information has an error, and (4) when it has been determined that the header information on the tape shaped record medium has an error in the step (3), if the number of time of the process counted at the step (2) is smaller than a predetermined value, changing the position of the header information recorded on the tape shaped record medium and recording the header information to the changed position.

The present invention is a digital recording/reproducing method for recording/reproducing digital data and dummy data/header information to/from a data area and a dummy data as a plurality of divided data areas of a tape shaped record medium, comprising the steps of (1) recording the dummy data to the header area of the tape shaped record medium, (2) counting the number of times of a process for recording the header information to the tape shaped record medium, (3) reproducing the head information that has been recorded with the recording/reproducing head and comparing the recorded data with the reproduced data so as to determine whether or not the header information recorded on the tape shaped record medium has an error, and (4) changing the position at which the header information is recorded on tape shaped record medium, wherein if it has been determined that the header information has an error in the step (3) and the count value is smaller than a predetermined value, the step (1) is executed just after the step (4).

According to the present invention, if header information has been unsuccessfully written to the header area, the write position of the header information is moved to the tape end side and the header information is rewritten to the moved position. Thus, when the header information is rewritten, the retry process is not failed by the same cause.

In addition, according to the present invention, the address information in the longitudinal direction of the tape is rewritten so that the address information of the rewritten header area is always kept. Thus, even after the header information has been rewritten, it can be accessed in the same manner as before.

BRIEF DESCRIPTION OF DRAWINGS

FIG. 6 is a schematic diagram for explaining a bad spot;

FIG. 7 is a schematic diagram showing a structure of a logical track set;

BEST MODES FOR CARRYING OUT THE INVENTION

Next, with reference to the accompanying drawings, an embodiment of the present invention will be described.

a. Magnetic tape apparatus according to the present invention b. Write process for a VSIT and a DIT and retry process thereof b1. Normal write process for a VSIT b2. Retry process for a VSIT b3. Normal write process for a DIT b4. Retry process for a DIT C. Retry process for a VSIT according to an embodiment c1. Outlined description c2. Detailed description of process d. Retry process for a DIT according to an embodiment d1. Outlined description d2. Detailed description of process e. Examples of modifications a. Magnetic Tape Apparatus According to the Present Invention Before explaining the present invention, a magnetic tape apparatus according thereto will be described. The magnetic tape apparatus that will be described in the following records and reproduces digital data to/from a cassette tape with a rotating head. Hereinafter, the magnetic tape apparatus is referred to as a data recorder.

Figure 1:
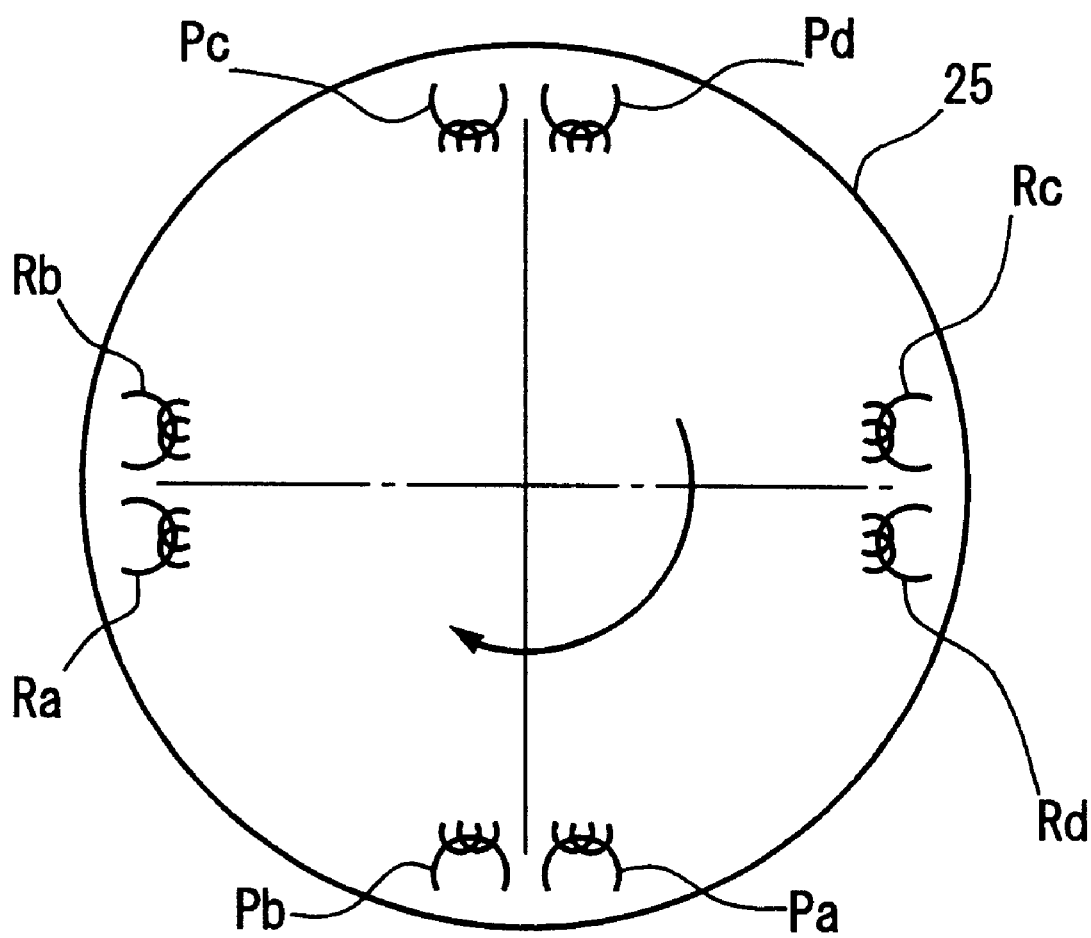
FIG. 1 is a schematic diagram showing an example of a head arrangement of a recorder.

The data recorder records and reproduces digital data to/from the cassette tape with the rotating head. FIG. 1 shows an example of a head arrangement of the recorder. Four recording heads Ra, Rb, Rc, and Rd and four reproducing (playback) heads Pa, Pb, Pc, and Pd are disposed on a drum 25 that rotates at a predetermined speed in the direction shown in FIG. 1.

The heads Ra and Rb are adjacently disposed. The heads Rc and Rd are adjacently disposed. The heads Pa and Pb are adjacently disposed. The heads Pc and Pd are adjacently disposed. The extended direction of the gap of one member of a pair of heads is different from that of the other member of the pair. This gap is referred to as an azimuth. Each of the heads Ra and Rc that are disposed at an interval of 180° has a first azimuth. Each of the heads Rb and Rd that are disposed at an interval of 180° has a second azimuth. In addition, each of the heads Pa and Pc has a first azimuth. Each of the heads Pb and Pd has a second azimuth. With these different azimuths, a cross talk can be prevented on adjacent tracks. Each of two adjacent heads is accomplished by an integrated head referred to as a double azimuth head.

A tape (for example, ½ inch wide) taken from the cassette is wound at a predetermined angle for an angle range of 180° or more on the periphery of the drum 25. The tape is traveled at a predetermined speed. Thus, when a recording operation is performed, at the first half turn of a rotation of the drum 25, the heads Ra and Rb scan the tape. At the second half turn of the rotation of the drum 25, the heads Rc and Rd scan the tape. When a reproducing operation is performed, the heads Pa and Pb scan the tape. Thereafter, the heads Pc and Pd scan the tape.

Figure 2:
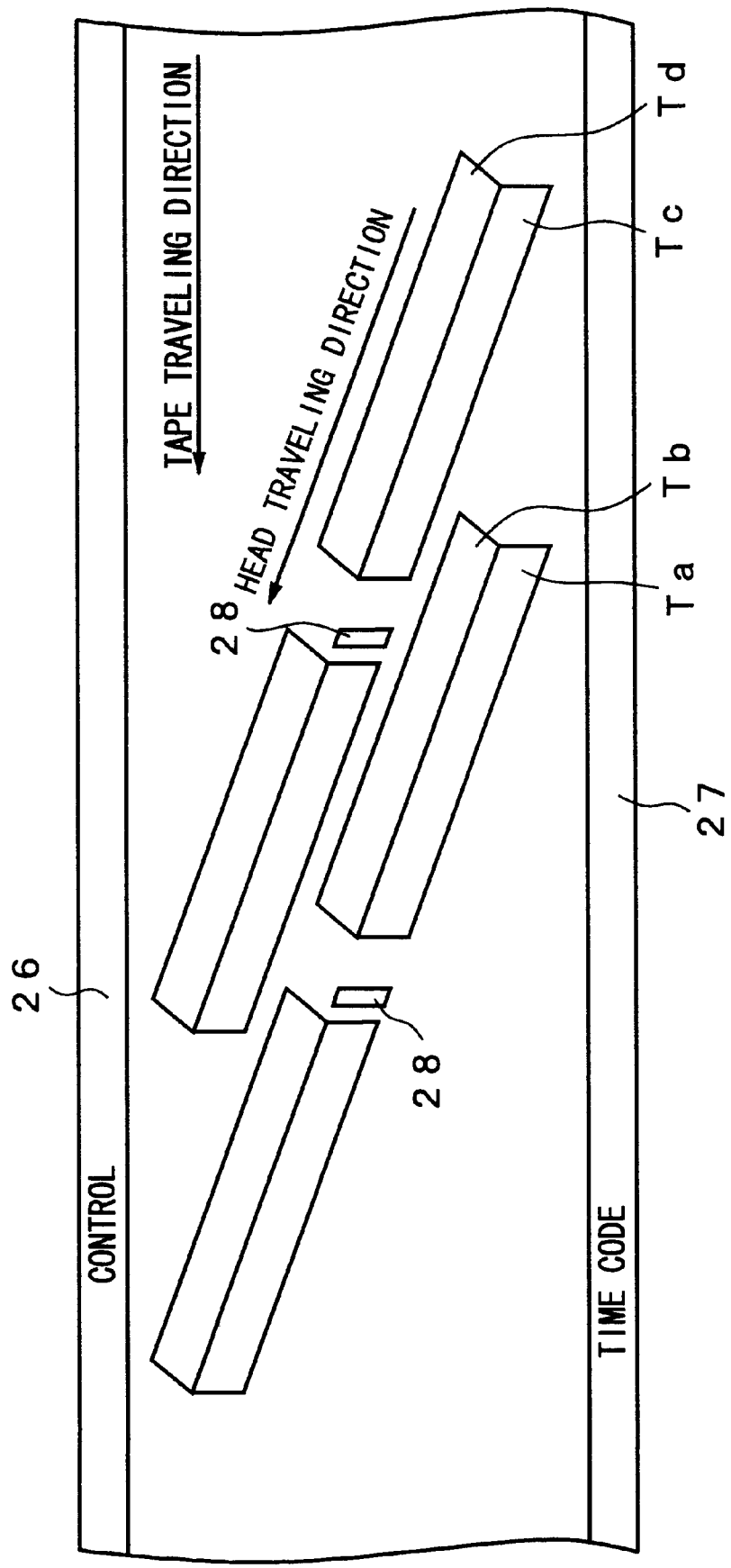
FIG. 2 is a schematic diagram showing a track pattern on a tape of a data recorder.

FIG. 2 shows a track pattern on the tape of the data recorder. Longitudinal tracks are formed at upper and lower portions in the width direction of the tape. Helical tracks are formed between the upper and lower portions. A control signal is recorded on the upper longitudinal track 26. A time code is recorded on the lower longitudinal track 27. Hereinafter, the longitudinal tracks 26 and 27 are referred to as a CTL track. The time code represents the position in the longitudinal direction of the tape. For example, SMPTE time code is used. As the drum 25 turns once, the heads Ra and Rb form two helical tracks Ta and Tb at the same time. Thereafter, the heads Rc and Rd form two helical tracks Ta and Tb at the same time. Each helical track is composed of a front half portion and a rear half portion that are separated. A record area 28 for recording a tracking pilot signal is formed between the front half portion and the rear half portion.

The SMPTE time code was developed for a video signal for VTRs and so forth. The minimum unit of the SMPTE time code is a frame (⅟₃₀ second). As will be described later, the data recorder treats data that can be recorded on four tracks Ta to Td shown in FIG. 2 as a data unit handled therewith (this data unit is referred to as a track set). When for example 16 tracks correspond to one frame of the video signal, a digit lower than the frame digit of the time code is designated. The value of the digit lower than the frame digit is one of 0, 1, 2, and 3. With this digit, a time code with a unit of 16 tracks should be used. This time code is referred to as an ID. The unit of 16 tracks is referred to as a track set. In the data recorder according to the present invention, the SMPTE time code is used as a time code of which a track set is composed of four tracks. The SMPTE time code has a user area for such a modification.

Figure 3:
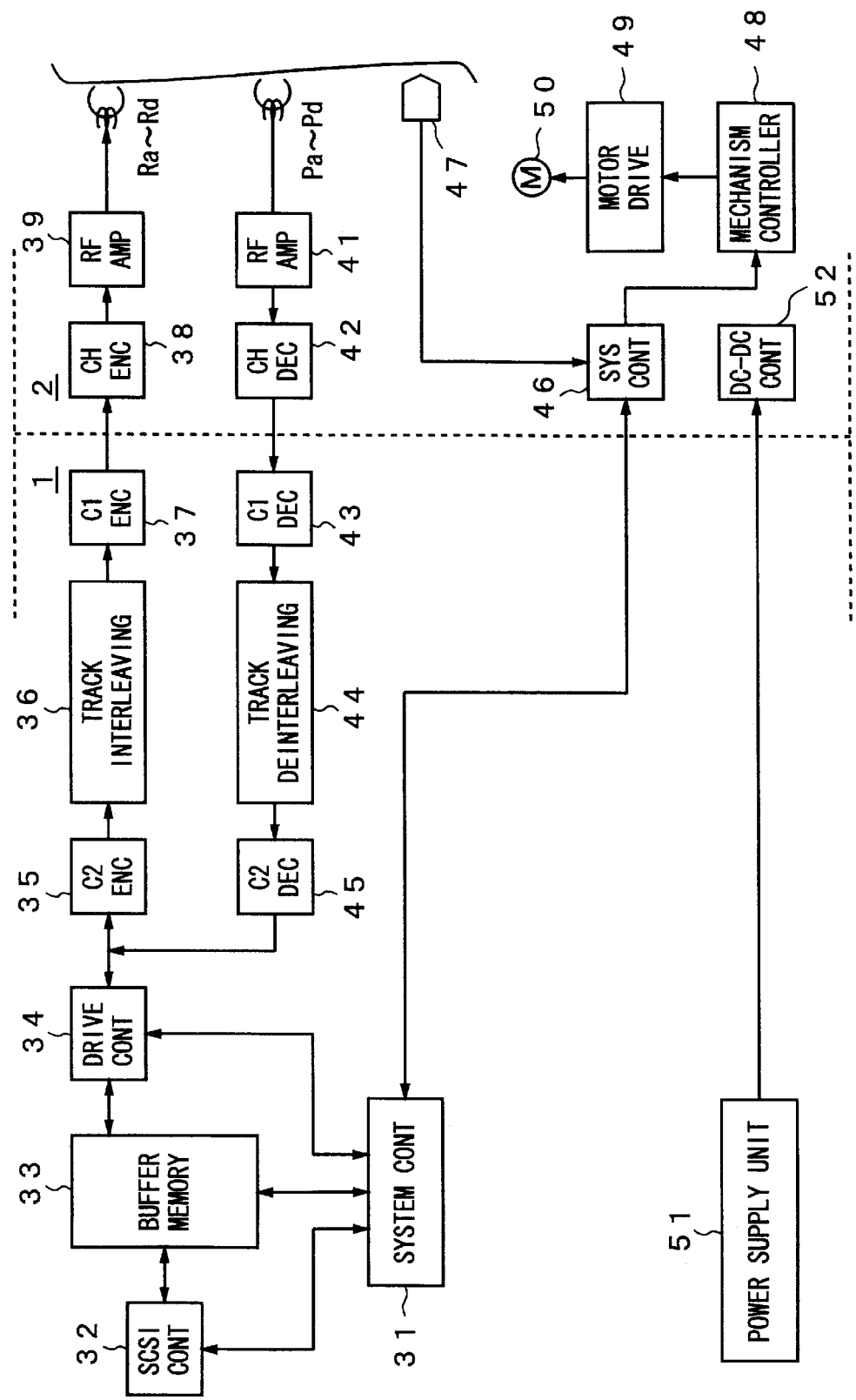
FIG. 3 is a block diagram showing a system structure of the data recorder.

FIG. 3 is a schematic diagram showing a system structure of the data recorder. As shown in FIG. 3, the system is composed of a tape drive controller portion 1 and a digital information recorder portion 2. The major functions of the system controller 31 of the controller portion 1 are to:

manage a SCSI controller 32, manages a buffer memory 33, manage a file/table, control data write/read process and retry process thereof, control the digital information recorder portion 2, and perform a self diagnosis process.

The system controller 31 is connected to a host computer through the SCSI controller 32. A drive controller 34 is disposed between the buffer memory 33 and the tape drive controller. Data read from the buffer memory 33 is supplied to a C2 encoder 35 through the drive controller 34. A track interleaving circuit 36 and a C1 encoder 37 are connected to the C2 encoder 35.

The C2 encoder and the C1 encoder 37 perform an error correction code encoding process for record data with a product code. The track interleaving circuit 36 controls the distribution of data to tracks so as to enhance the correcting performance against an error that takes place in the recording/reproducing process.

Since data is recorded on the tape as sync blocks delimited by a synchronous signal, the track interleaving circuit 36 adds the block synchronous signal to the record data. In addition, after the C1 encoder 37 generates a C1 parity, it randomizes data and interleaves words of a plurality of sync blocks.

The C1 encoder 37 sends digital data to the digital information recorder portion 2. The digital information recorder portion 2 encodes the digital data received from the channel code encoder 38 so that the digital data becomes suitable for the reproducing/reproducing operation and outputs record data to the recording heads Ra to Rd through an RF amplifier 39. The heads Ra to Rd record the record data on the tape. The RF amplifier 39 performs a process for partial response class 4 (PR (1, 0, −1)) so as to lower the frequency band of the record signal and easily detect a reproduction signal.

Data reproduced from the tape by the reproducing heads Pa to Pd is supplied to a channel code decoder 42 through an RF amplifier 41. The RF amplifier 41 includes a reproducing amplifier, an equalizer, a Viterbi decoder, and so forth. Output data of the channel code decoder 42 is sent to a tape drive controller portion 1 and then input to a C1 decoder 43.

A track deinterleaving circuit 44 is connected to the C1 decoder 43. In addition, a C2 decoder 45 is connected to a deinterleaving circuit 44. The C1 decoder 43, the track deinterleaving circuit 44, and the C2 decoder 45 perform the reverse processes of the C1 encoder 37, the track interleaving circuit 36, and the C2 encoder 35, respectively. The reproduction (read) data received from the C2 decoder 45 is supplied to the buffer memory 33 through the drive controller 34.

The digital information recorder portion 2 has a system controller 46. In addition, the digital information recorder portion 2 has a fixed head 47 for a longitudinal tack of the tape. The head 47 is connected to the system controller 46. The head 47 records and reproduces the control signal and the time code. The system controller 46 is connected to the system controller 31 of the tape drive controller portion 1 through a bidirectional bus.

A mechanism controller 48 is connected to the system controller 46. The mechanism controller 48 includes a servo circuit. The mechanism controller 48 drives a motor 50 through a motor driving circuit 49. The system controller 46 has for example two CPUs. With the CPUs, the system controller 46 for example communicates with the tape drive controller portion 1, controls the recording/reproducing process for the time code, and controls the timings of the recording/reproducing operations.

The mechanism controller 48 has for example two CPUs so as to control a mechanical system of the digital information recorder portion 2. More reality, the mechanism controller 48 controls the rotation of the header and tape system, the tape speed, the tracking operation, the loading/unloading operation of the cassette tape, and the tape tension. The motor 50 is representative of a plurality of motors such as a drum motor, a capstan motor, a reel motor, a cassette mounting motor, and a loading motor.

In addition, the digital information recorder portion 2 has a DC—DC converting circuit 52 that inputs a DC voltage from a power supply unit 51 of the tape drive controller portion 1. Moreover, the digital information recorder portion 2 has position sensors such as a tape end detecting sensor and a time code generating/reading circuit (not shown).

Figure 4:
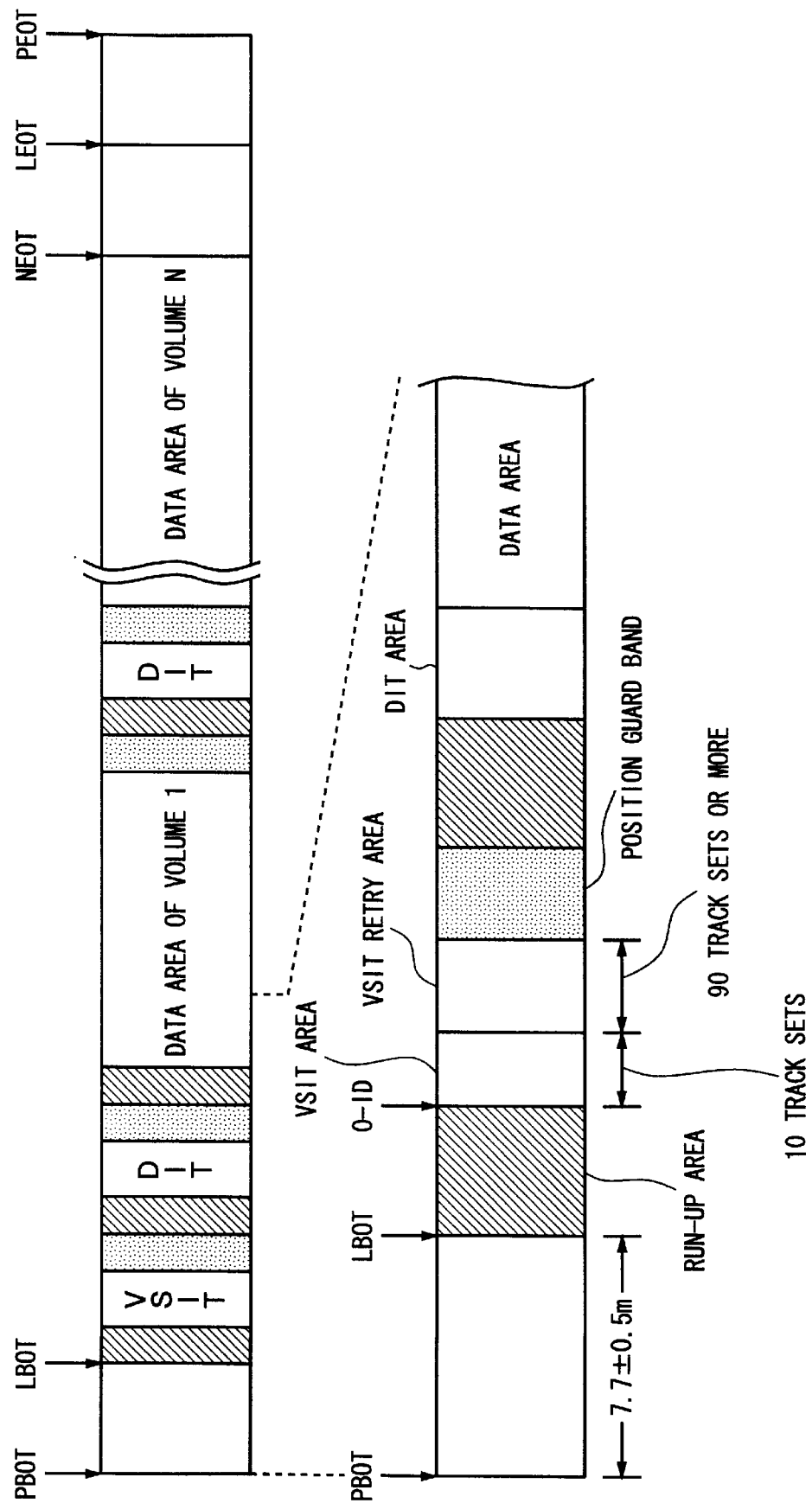
FIG. 4 is a schematic diagram showing a layout of the entire tape.

Next, the format for recording digital data will be described. FIG. 4 shows a layout of the entire tape (for example, the tape of a cassette). The entire tape is referred to as a physical volume. A leader tape is connected to each tape. A recordable area is disposed between a physical start end PBOT (Physical Beginning of Tape) of the tape and a last end PEOT (Physical End of Tape). The recordable area starts with an LBOT (Logical Beginning of Tape) and an LEOT (Logical End of Tape). This is because the tape tends to be damaged at the start end and last end of the tape and thereby the error rate thereof is high. For example, the invalid area between the PBOT and LBOT has been defined as 7.7±0.5 m. In addition, the invalid area between the PEOT and the LEOT has been defined as 10 m or larger.

A plurality of logical volumes (that are referred to as partitions) are disposed in one physical volume. To manage at least one partition (logical volume), a VSIT (Volume Set Information Table) is recorded. The VSIT has the number of volumes recorded on the tape and the position information of each logical volume. The position information is composed of start physical IDs and last physical IDs of DITs of up to 1024 logical volumes.

The start position of the VSIT is defined as 0-ID. An ID (identification) is an address assigned to each track set of four tracks and represents the position of the tape. The ID simply increases from the VSIT area of the first volume to the DIT area of the last volume. The length of one VSIT is 1-ID.

There are two types of IDs in the data recorder according to the present invention, that is, physical IDs and logical IDs.

A physical ID is position information that represents absolute position information of a track set on the tape. The physical ID corresponds to a time code recorded in the longitudinal direction of the tape.

A logical ID is position information that represents the relative position of a track set on the tape. The logical ID is recorded at a predetermined position of a track set.

The physical ID and logical ID at the start position 0-ID of the VSIT are 0.

A logical volume is composed of a DIT (Directory Information Table), a UIT (User Information Table), and an user data area. The DIT has information for managing a file in a logical volume. The length of one DIT is 40-ID. The UIT is optional (thus, not shown in FIG. 4). The UIT is user intrinsic information for managing a file.

In FIG. 4, hatched areas represent run-up areas. A run-up area causes a data track to be servo-locked. Dotted areas represent position guard bands. When VSITs and DITs are updated, position guard bands prevent valid data from being erased.

Figure 5A:
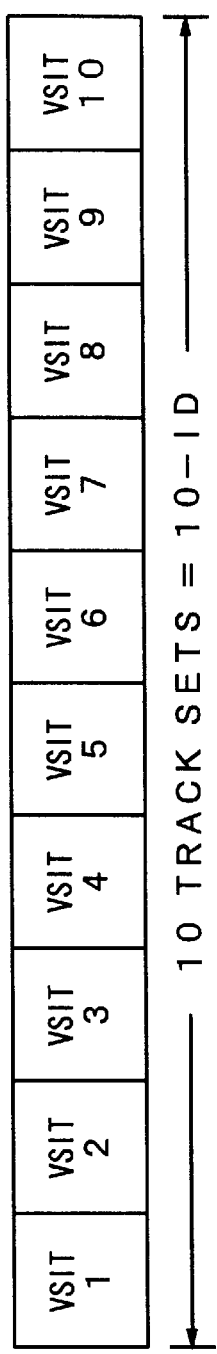
FIGS. 5A–C are diagrams to which reference will be made in explaining a recording method of a VSIT and a DIT.

To improve the reliability of data, as shown in FIG. 5A, a VSIT is repeatedly recorded ten times. Thus, the VSIT area has 10 track sets (=10-ID). The VSIT area is followed by a retry area having 90 track sets or more.

Figure 5B:
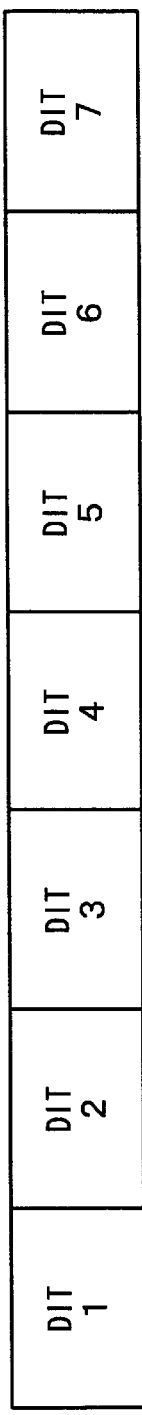
Figure 5C:
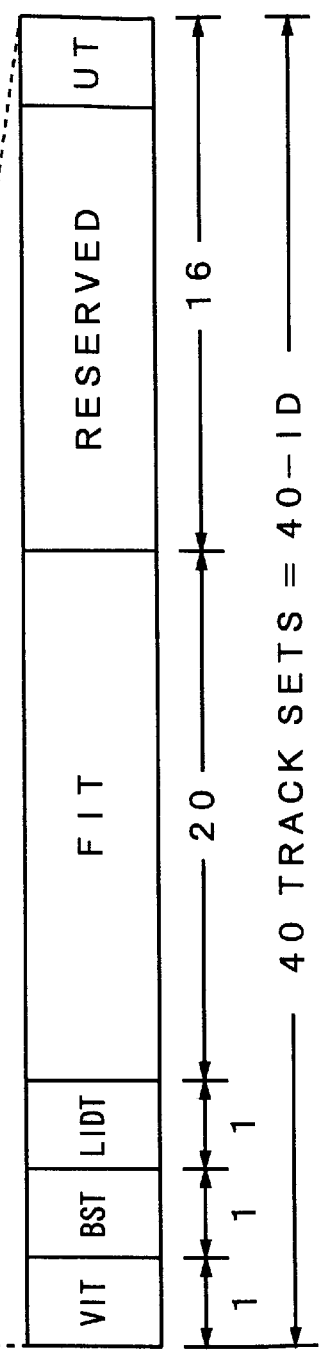

To improve the reliability of data, a DIT is repeatedly seven times recorded as shown in FIG. 5B. A DIT is composed of six tables as shown in FIG. 5C. The six tables are a VIT (Volume Information Table), a BST (Bad Spot Table), an LIDT (Logical ID Table), an FIT (File Information Table), an UT (Update Table), and an UIT (User Information Table). The length of each of the VIT, BST, LIDT, and UT is 1-ID. The length of the table FIT is 20-ID. The remaining 16-ID area is reserved.

Next, each table of the DIT will be described. The ID address of the VIT is the start physical ID of the volume in the VSID. The logical ID of the VIT is equal to the start physical ID of the volume in the VSIT. The VIT includes information of the volume such as the volume label, the start physical ID of the first data block of the physical volume and the last physical ID.

The ID address of the BST is equivalent to the physical ID of the VIT plus 1. The logical ID of the BST is equivalent to the logical ID of the VIT plus 1. The BST has position information of data that is treated logically invalid. The logically invalid data is data that is treated invalid because data whose track set ID has been used is newly written. For example, as shown in FIG. 6, a hatched area A is logically invalid data. A write retry process and a write process in association therewith result in logically invalid data. If an error takes place while data is being written, a write retry process is automatically performed and an error location is output. The error location is registered to the BST. When the read process is performed, the BST represents the invalid area. The logically invalid data is also referred to as a bad spot. The BST contains start physical IDs and the end physical IDs of up to 14592 bad spots.

The ID address of the LIDT is equal to the physical ID of the VIT plus 2. The logical ID of the LIDT is equal to the logical ID of the VIT plus 2. The LIDT is a data table used for a high speed block space and locating operation. In other words, the LIDT includes the logical IDs and the physical IDs of pointers 1 to 296, the file number, and the first block number of the ID data in the block management table.

The ID address of the FIT is equal to the physical ID of the VIT plus 3. The logical ID of the FIT is equal to the logical ID of the VIT plus 3. The FIT is composed of a plurality of pairs of two types of data corresponding to a tape mark. The tape mark is a delimiter code for a file. The N-th data pair corresponds to the N-th tape mark counted from the beginning of the volume. One member of each pair is the physical ID of the N-th tape mark. The other member is the absolute block number of the N-th tape mark. This value is the absolute block number of the last block with the same file number as the tape mark. With the physical ID of the tape mark and the absolute block number, since the position of the tape mark can be accurately obtained, the physical position on the tape can be quickly accessed.

The ID address of the UT is equal to the physical ID of the VIT plus 39. The UT is information that represents whether or not the volume has been updated. Before the volume is updated, the word (four bytes) of the UT that represents the update status is FFFFFFFFh (where h represents hexadecimal notation). After the volume is updated, the word becomes 00000000h.

The UIT is optional. The UIT has an area of for example 100-ID. The UIT is a data table that the user can access. The UIT is used for a user header.

In this example, 1-ID is assigned for each track set (each track set is composed of four helical tracks). The logical structure of a data block is defined for each track set. FIG. 7 shows a structure of a logical track set. The first four bytes of the logical track set represent a format ID that is FFFF000h.

The next 136 bytes (34 words) represent an area for sub code data. The sub code data is composed of management information of a track set. The sub code includes the above-described tables (VSIT, VIT, BST, and so forth), user data, and ID codes such as tape mark and EOD. With the sub code data, the track set can be identified.

The sub code data is followed by an area of 116884 bytes. This area includes a user data area and a block management table. When the size of the user data is smaller than the size of the write area, the remaining area is filled with dummy data. There are four types of track sets defined in the user data area, that is, a user data track set for user data, a tape mark (TM) track set that represents a tape mark, an EOD (End of Data) track set that represents an EOD, and a dummy track set that represents dummy data. The sub code is defined corresponding to the format of the track set.

As described above, the user data is followed by the block management table area. The length of the block management table is max. 4096 bytes. The last four bytes of the track set are a last end code (0F0F0F0Fh) of the track set. The last end code is preceded by a reserved area of 12 bytes. The block management table manages the data block structure of the user data.

Figure 8:
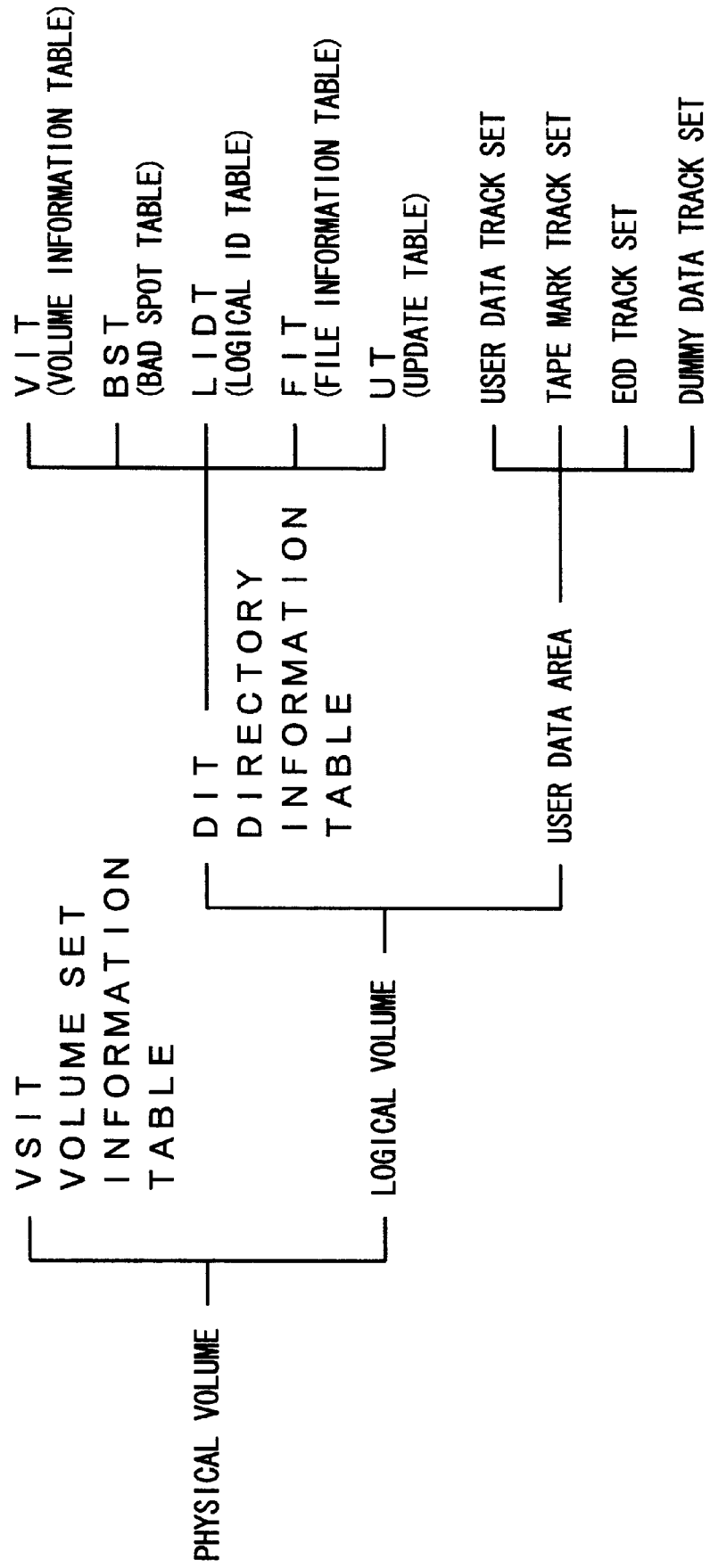
FIG. 8 is a schematic diagram showing logical formats of the data recorder.

FIG. 8 shows logical formats of the above-described data recorder. A VSIT is recorded for each physical volume such as one tape. A DIT is recorded for each logical volume (partition). The DIT includes five tables a VIT, a BST, an LIDT, an FIT, and a UT. The DIT optionally includes a UIT. The user data area includes four types of track sets, that is, a user data track set, a tape mark track set, an EOD (End Of Data) track set, and a dummy track set.

As described above, as to the data recorder, a plurality of partitions can be assigned to one tape. Thus, the user should search a desired partition. A desired partition is searched in one of the following two methods.

As one method, a physical ID is calculated with the rotating angle of the reel of the tape. This method is referred to as IDC (IDCount) search method. In this method, since the physical ID of the tape is indirectly obtained from the tape, it is not necessary to have formed a time code track corresponding to a desired search position on the tape. Thus, when a time code track has not been formed between partitions, to move the head therebetween, the IDC search method should be inevitably used as in the case that a new partition is tried to be created in a non-use area of the tape.

As the other search method, a time code written on the longitudinal time code track is scanned so as to search a desired position while reading physical IDs of the tape. This method is referred to as IDR (ID Read) search method. In the IDR search method, since the physical IDs written on the tape are read, a desired partition can be accurately searched.

Figure 9:
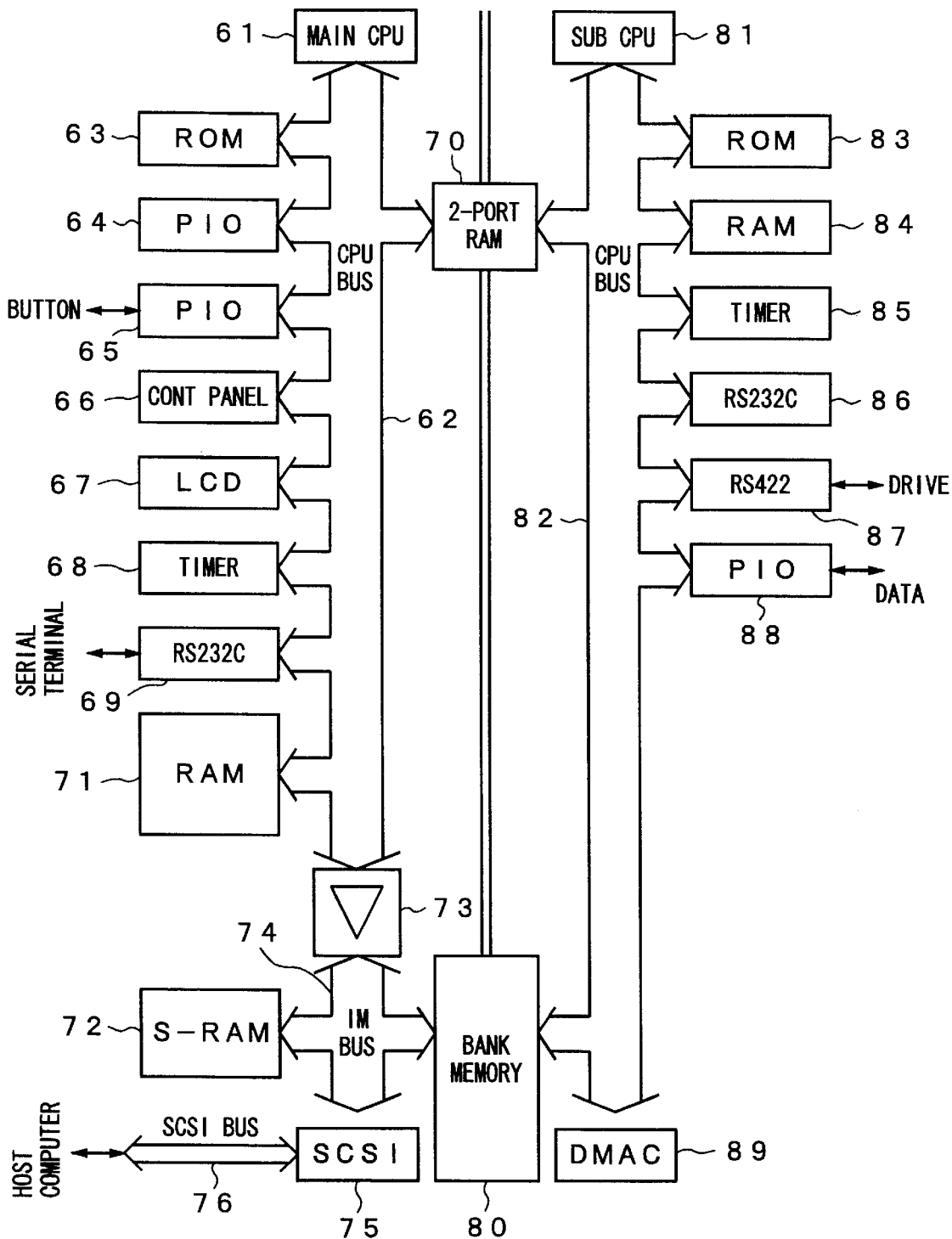
FIG. 9 is a block diagram showing an example of a system structure for controlling the data recorder.

FIG. 9 shows an example of a system structure for controlling the data recorder. Reference numeral 61 is a main CPU. Reference numeral 70 is a two-port RAM. Reference numeral 80 is a bank memory. Reference numeral 81 is a sub memory. The main CPU 61 is a CPU that controls the entire system. In association with the main CPU 61, a CPU bus 62 is disposed. Each structural element of the system is connected to the CPU bus 62. In other words, a ROM (flash ROM) 63, PIOs (parallel I/Os) 64 and 65, a control panel 66, an LCD 67, a timer 68, an RS232C interface 69, a two-port RAM 70, and a RAM 71 are connected to the CPU bus 62.

The PIO 65 is connected to buttons on the front panel. The LCD 67 is a display device that displays the operation status of the drive for the user. The RS232C interface 69 is connected to a serial terminal. The RAM 71 has a work RAM area for firmware, a program download area, and header information (VSIT/DIT) temporary storing area. In addition, the RAM 71 has an area for storing an initial value of a time code written to the CTL track.

An IM bus 74 is connected to the CPU bus 62 through a one-way control device 73. An S-RAM 72, a bank memory 80, and a SCSI controller 75 are connected to the IM bus 74. A host computer is connected to the SCSI controller 75 through a bus 76. The S-RAM 72 is an RAM whose power is backed up by a condenser. The S-RAM 72 is a memory for script (storing a control program for the SCSI controller). In addition, the S-RAM 72 is a logger memory for storing the real operation status of the system. The power of this memory is backed up by a condenser. Thus, even if the power of the system is turned off, the S-RAM 72 can hold data for around two days.

The two-port RAM 70 stores the following five types of packets for communicating information between two CPUs 61 and 81:

command send packet with which the CPU 61 requests the sub CPU 81 to execute an operation, end status receive packet with which the sub CPU 81 informs the CPU 61 of an end status when the CPU 81 has completed a command requested by the CPU 61, command status that is a flag that represents the status of a command, drive management status table for informing the CPU 61 of the status of the drive (this table is updated by the CPU 81 at a predetermined period), and data send/receive packet that is a buffer used when the firmware of the drive (recorder) is downloaded through the SCSI bus or when the self diagnosing operation of the drive is activated with the serial port of the CPU 61. The bank memory 80 is a buffer memory for storing data.

The sub CPU 81 is a CPU that controls the drive. In association with the sub CPU 81, a CPU bus 82 is disposed. A ROM (flash ROM) 83, a RAM (work RAM) 84, a timer 85, an RS232C interface 86, an RS422 interface 87, an PIO 88, and a DMA controller 89 are connected to the bus 82. In addition, the two-port RAM 70 and the bank memory 80 are connected to the bus 82.

The bank memory 80 is a bank memory that stores data to be written to the tape or data to be read therefrom. The bank memory 80 has for example eight memory banks that store write data and read data. The DMA (Direct Memory Access) controller 89 is a controller that stores data written to the drive to the bank memory 80. The RS232C interface 86 is used for a self diagnosing operation. The RS422 interface 87 is a communicating means to the drive. The drive is controlled through the RS422 interface 87. Data is exchanged with the tape through the PIO 88.

b. Write Process for a VSIT and a DIT and Retry Process Thereof b1. Normal Write Process for a VSIT In this part, a normal write process for a VSIT in the above-described data recorder (in this process, an error does not take place) will be described with reference to the accompanying drawings. In the following description, although ID sometimes represents both a physical ID or the distance measured from the PBOT, unless otherwise specified, it represents a physical ID.

Figure 10:
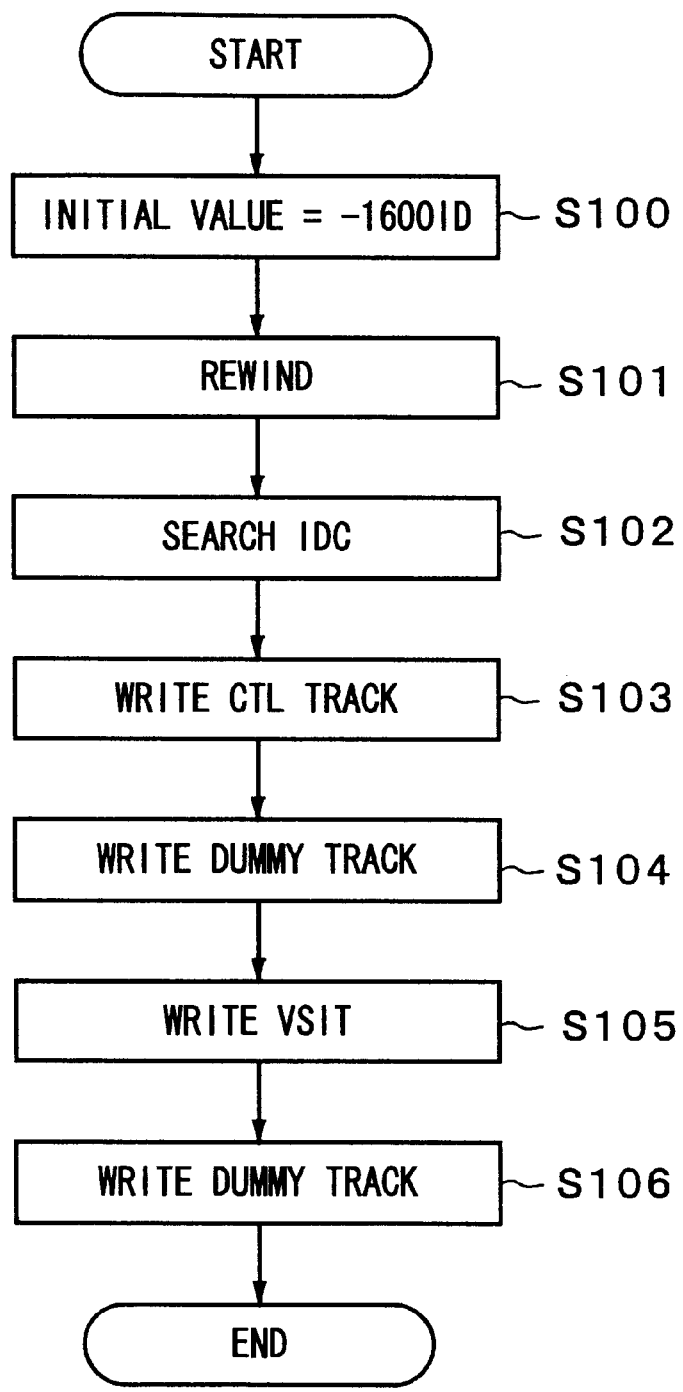
FIG. 10 is a flow chart for explaining a normal write process for a VSIT.
Figure 11A:
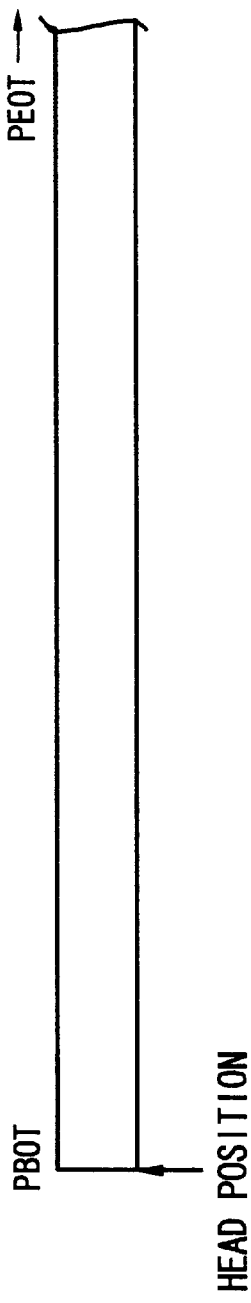
FIGS. 11A–F are diagrams to which reference will be made in explaining the relation between a tape and a head in the case that a VSIT is normally written.

FIG. 10 is a flow chart for explaining a normal write process for a VSIT. FIG. 11 is a schematic diagram showing the relation between the tape and the head at the point. In FIG. 11, the left side represents the PBOT side. The right side represents the PEOT side. At step S100 in FIG. 10, the initial value of the physical ID is set to −1600ID. The tape is rewound to the PBOT (at step S101). FIG. 11A shows the relation between the tape and the head at this point.

Figure 11B:
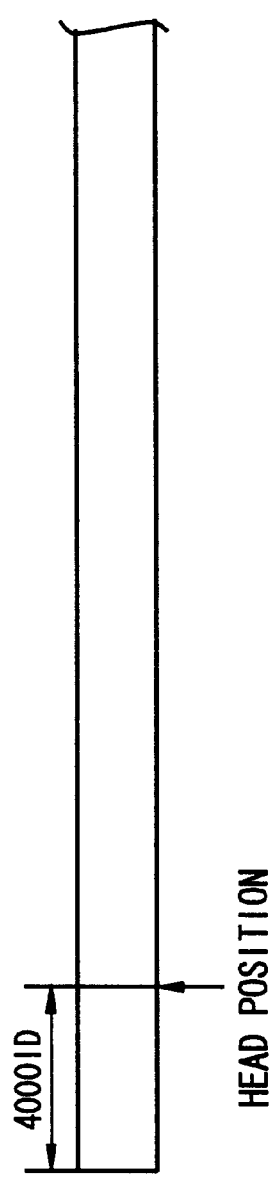

At step S102, the tape that has been rewound to the PBOT is fast forwarded for 7.7 m (around 4000ID) (see FIG. 11B). In the format of the DTF according to the embodiment of the present invention, since the characteristics of the start portion of the tape are unstable, the tape is used from the portion 10 meters apart from the PBOT. This portion is searched by the above-described IDC search method. In consideration of an error of the search process, the tape is actually forwarded to the position 7.7 meters apart from the PBOT. The position 4000ID apart from the PBOT is set to the initial value −1600ID of the physical ID that has been set at step S100.

Figure 11C:
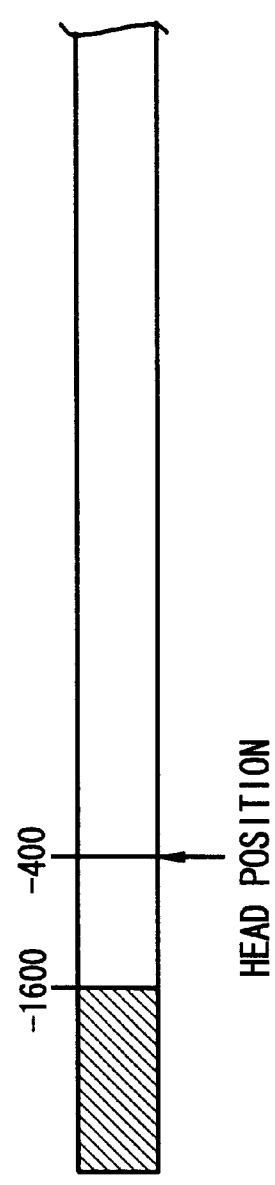
Figure 11D:
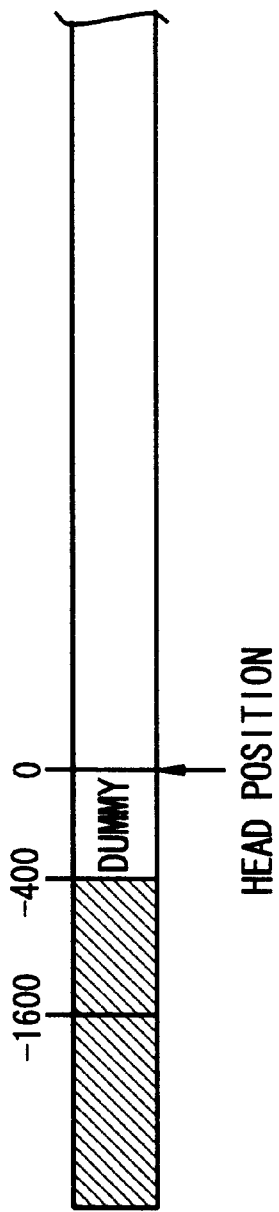

Data is written from −1600ID as the initial value of the physical ID for 1200ID to the CTL track (at step S103). As shown in FIG. 11C, the head is moved to −400ID. At step S104, dummy data is written from −400ID to −1ID. FIG. 11D shows the position of the head at this point. An area from −400ID toward the PEOT for 1100ID (namely, to 699ID) is used for a VSIT and dummy data as a guard thereof.

Figure 11E:
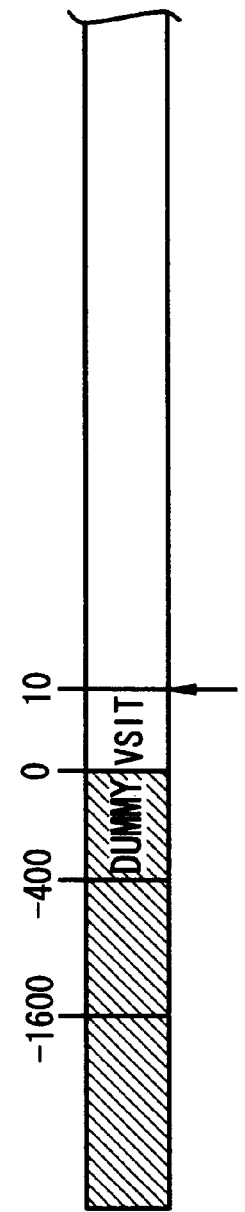

At step S105, a VSIT that has been created and stored in a predetermined memory is written from 0ID to 9ID. Although the VSIT has an area for only 1ID, in consideration of the reliability of data, the same VSIT is repeatedly written ten times. FIG. 11E shows the position of the head in the case that the VSIT has been just written.

Figure 11F:
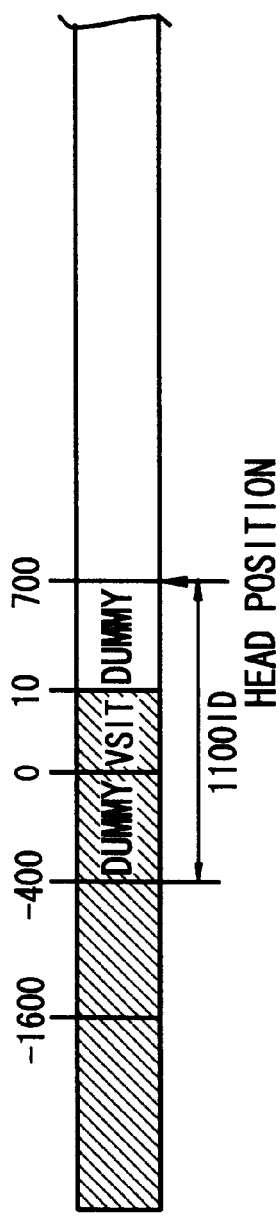

After the VSIT has been written, as described above, dummy data is written until 1100ID (at step S106). In this case, the dummy data is written from 10ID to 699ID. FIG. 11F shows the position of the head at this point. Thus, the normal write process for the VSIT is completed.

Figure 12:
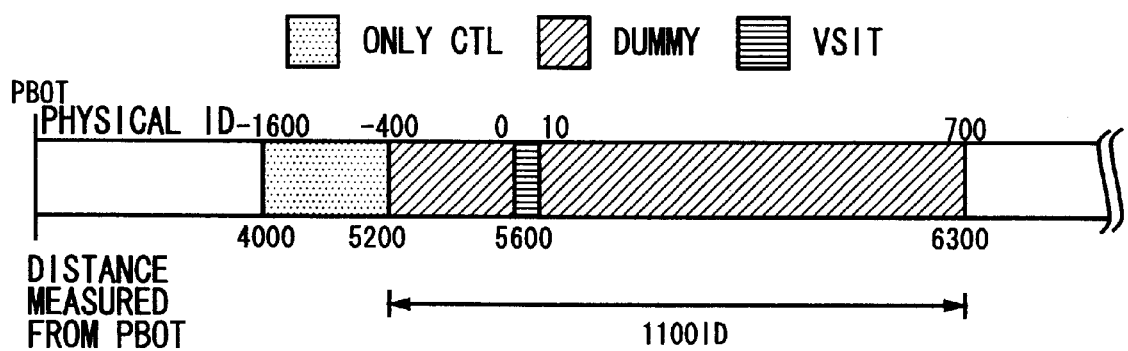
FIG. 12 is a schematic diagram showing the state that a VSIT is normally written to a tape.

FIG. 12 shows the state that a VSIT has been written to the tape. In FIG. 12, the left end is the PBOT. The distance measured from the PBOT is represented in the unit of ID . Thus, the position apart from the PBOT for 4000ID is −1600ID as physical ID. No data is written from the PBOT to −1600ID. Only a CTL signal is written for 1200ID from −1600ID to −399ID. A VSIT track and a dummy track are written from −400ID to 699ID for 1100ID. A VSIT with an area of 1ID is repeatedly written ten times for 10ID from 0ID to 9ID in the area for 1100ID.

When data is written, just after that, the data is read so as to determine whether or not the data has been correctly written. In other words, a read-after-write process is performed. In other words, while data is being recorded by the recording heads Ra and Rb mounted on the drum 25 shown in FIG. 1, the recorded data is reproduced by the reproducing heads Pa and Pb disposed opposite to the recording heads Ra and Rb so as to compare the recorded data with the reproduced data. Likewise, while data is being recorded by the recording heads Rc and Rd, the recorded data is reproduced by the reproducing heads Pc and Pd disposed opposite to the recording heads Rc and Rd.

b2. Retry Process for a VSIT

Figure 13:
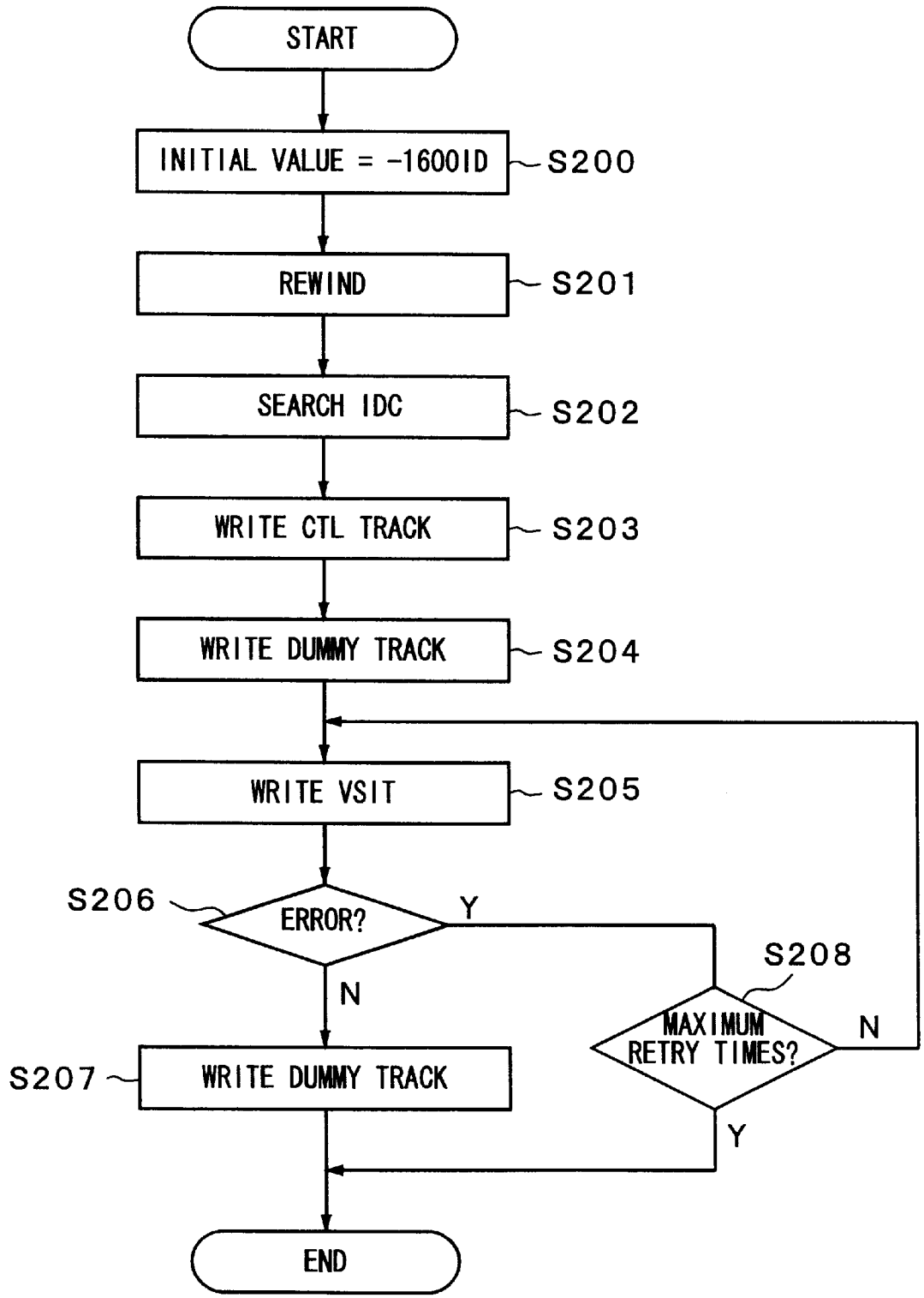
FIG. 13 is a flow chart showing a normal write retry process for a VSIT.

In this part, a process in the case that after an error has been detected in a write process for a VSIT, a normal retry process for the VSIT is performed. FIG. 13 is a flow chart for explaining the retry process. Steps S200 to S205 in this flow are the same as corresponding steps in the flow chart for the normal write process for a VSIT. In other words, at step S200, the initial value of the physical ID is set to −1600ID. The tape is rewound to the PBOT (at step S201). At step S202, the tape that has been rewound to the PBOT is fast forwarded for 7.7 meters (around 4000ID) by the IDC search process for a stable operation of the tape. The position apart from the PBOT for 4000ID is the initial value −1600ID of the physical ID that has been set at step S200.

A CTL track is written from −1600ID at the initial value of the physical ID to −399ID for 1200ID (at step S203). At step S204, a dummy track is written from −400ID to −1ID. At step S205, VSIT data that has been stored in a memory or the like is repeatedly written ten times from 0ID to 9ID. As will be described later, step S205 is repeated for a predetermined number of times when it has been determined that the write data of the VSIT has an error. Thus, at step S205, the number of times of the retry process for the VSIT is counted.

When the retry process is performed, the VSIT is checked by the read-after-write process. Namely, at step S206, it is determined whether or not the write result has an error. When the determined result at step S206 is No (namely, the write result does not have an error), the flow advances to step S207. At step S207, dummy data is written until 1100ID (at step S207). In this case, the dummy data is written from 10ID to 699ID. Thus, the retry process for the VSIT is completed.

On the other hand, when the determined result at step S206 is Yes (namely, the write result has an error), the flow advances to step S208. In the retry process for the VSIT, the upper limit of the number of times thereof has been set. At step S208, it is determined whether or not the number of times of the retry process that has been performed becomes the maximum retry times (namely, the upper limit thereof). When the number of times of the retry process becomes a predetermined number of times for example 10 times, the tape is treated as an improper tape for use.

Thus, when the determined result at step S208 is Yes (namely, the number of times of the retry process becomes the upper limit), a message that informs the user that the tape cannot be used is issued and the retry process is terminated in the error state.

On the other hand, when the determined result at step S208 is No (namely, the number of times of the retry process does not become the upper limit), the flow advances to step S205. At this point, the initial value of the physical ID and the start position of the VSIT have not been changed. The similar write process for the VSIT is performed.

After the retry process for the VSIT has been completed, the VSIT is written as shown in FIG. 12 as with the case of the normal write process for the VSIT. As was described in the related art reference, since the VSIT has been written at the same position as before, if an error takes place due to a scratch or the like on the tape, the same error may take place in the VSIT.

b3. Normal Write Process for a DIT

Figure 14:
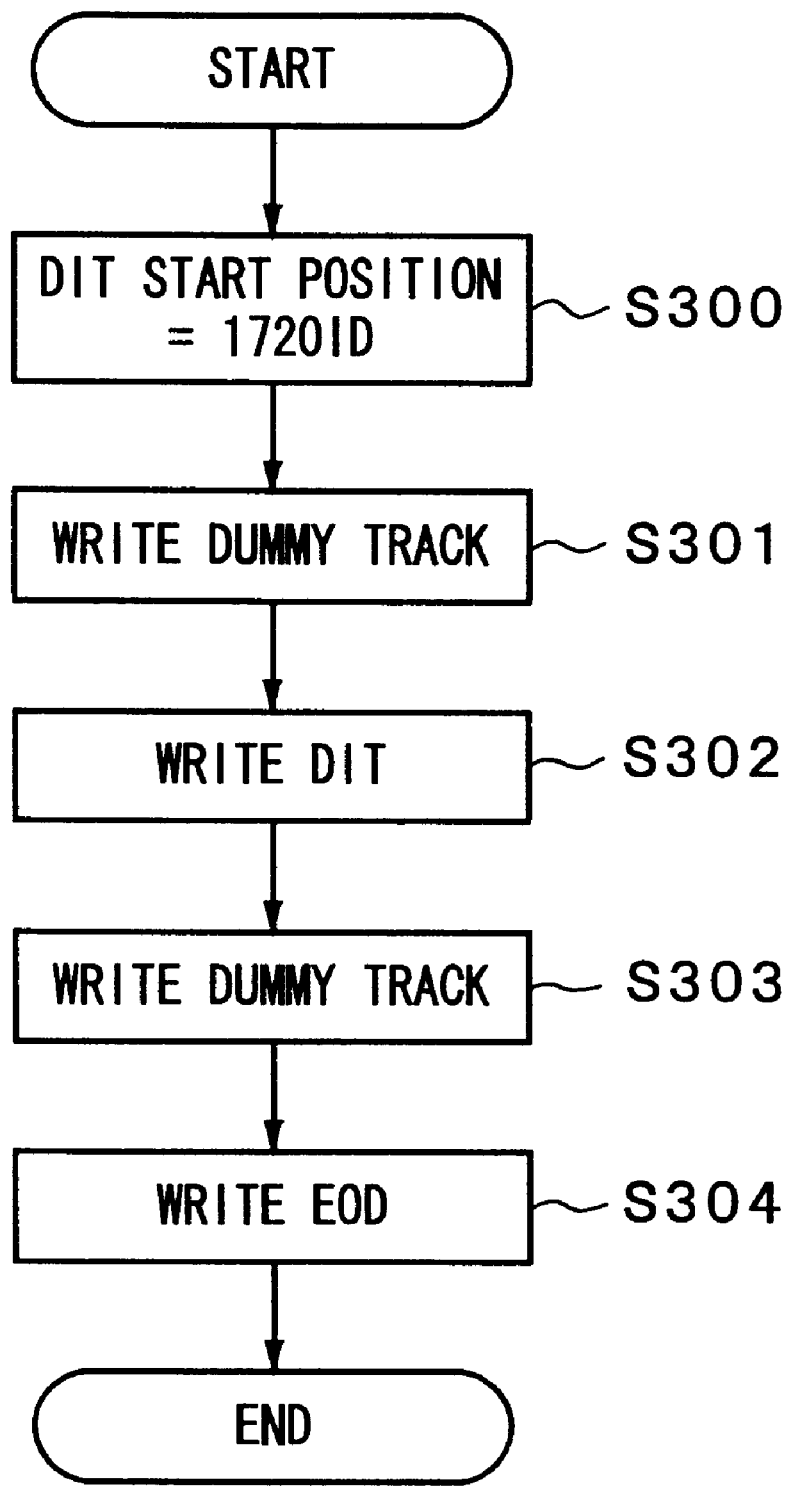
FIG. 14 is a flow chart for explaining the normal write process for a DIT.

In this part, a normal write process for a DIT in the above-described data recorder (in this process, an error does not take place) will be described with reference to the accompanying drawings. In this case, after the above-described VSIT has been written, a write process for a DIT is written for creating a first partition. FIG. 14 is a flow chart for explaining a normal write process for a DIT. FIG. 15 show the relation between the tape and the head in this process. In FIG. 15, the left side represents the PBOT side. The right side represents the PEOT side.

Figure 15A:
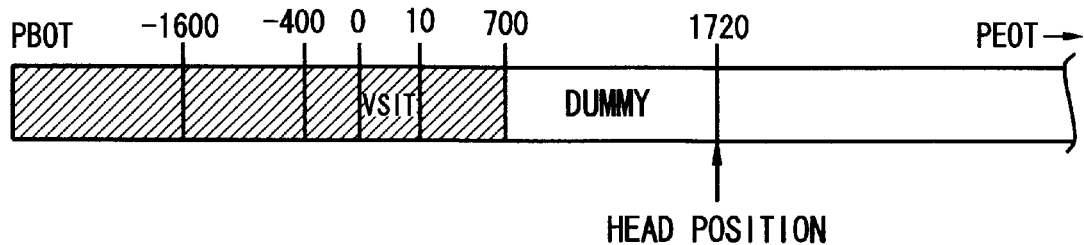
FIGS. 15A–D are diagrams to which reference will be made in explaining the relation between a tape and a head in the case that a DIT is normally written.

At step S300, the start position of the DIT is set to 1720ID. At step S301, a dummy track is written from 700ID that is the last end of the VSIT to 1719ID just before the start position of the DIT. FIG. 15A shows the position of the head at this point. An area from 700ID to 1719ID has a function as a guard for the VSIT.

Figure 15B:
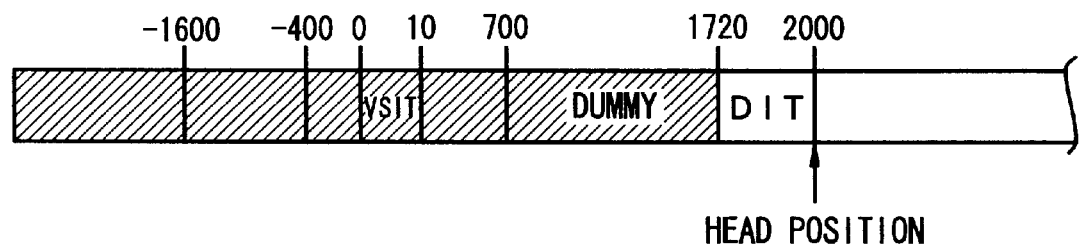

At this point, the data of the DIT has been stored in a predetermined memory or the like. At step S302, the DIT is written for 280ID from 1720ID that is the start position of the DIT to 1999ID. As described above, the DIT has a size of 40ID. However, to improve the reliability, the DIT is repeatedly written seven times. FIG. 15B shows the position of the head just after the DIT has been written.

Figure 15C:
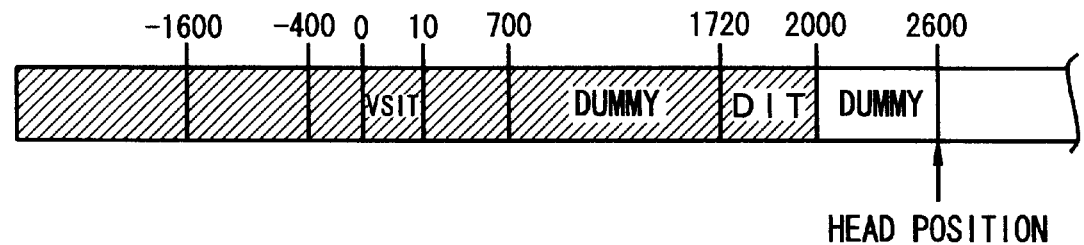
Figure 15D:
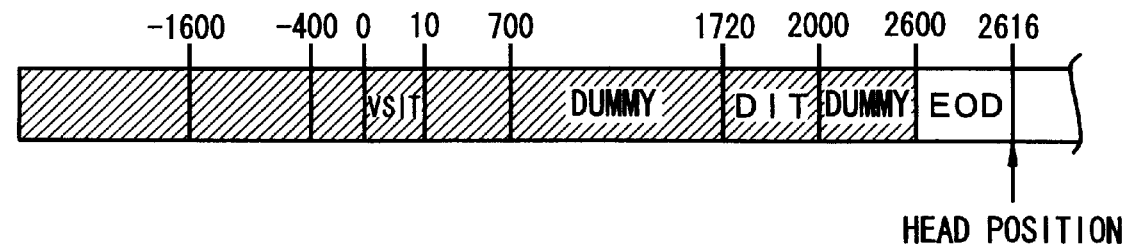

After the DIT has been written, dummy data is written for 600ID from 2000ID to 2599ID. This is because 2600ID is the start position of the user data. An area for 600ID from 2000ID to 2599ID functions as a guard track for the DIT. FIG. 15C shows the position of the head at this point. At step S304, the EOD is written from 2600ID that is the start position of the user data for 16ID. Thus, the normal write process for the DIT is completed. FIG. 15D shows the position of the head at this point.

Figure 16:
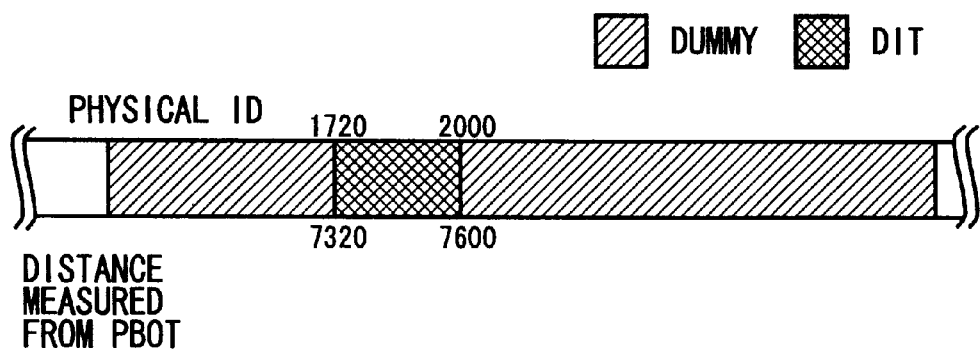
FIG. 16 is a schematic diagram showing the state that a DIT is written in the normal write process.

FIG. 16 shows the state of which the DIT has been written to the tape in such a manner. In FIG. 16, the left end is the PBOT. The distance measured from the PBOT is represented in the unit of ID. In such a manner, the DIT is written from the PBOT for 7320ID (or from 1720ID to 1999ID as physical ID). The DIT has a size of 40ID. The DIT is repeatedly written seven times. Before and after the DIT, dummy data is written.

b4. Retry Process for a DIT

Figure 17:
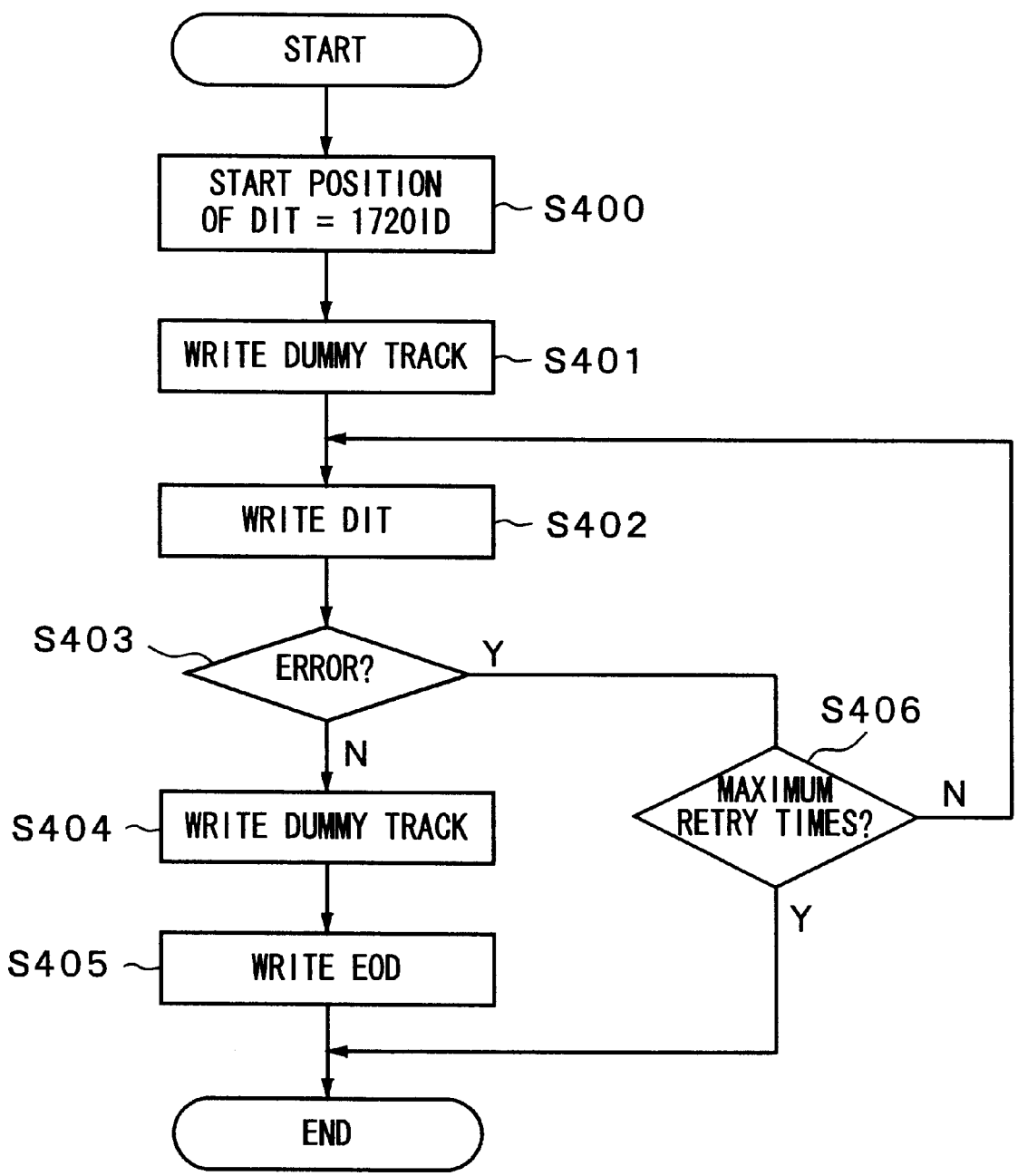
FIG. 17 is a flow chart showing a normal write retry process for a DIT.

In this part, a process in the case that after an error has been detected in a write process for a DIT, a normal retry process for the DIT is performed. FIG. 17 is a flow chart for explaining the retry process.

Steps S400 to S402 in this flow chart are the same as corresponding steps in the normal write process for the DIT. In other words, at step S400, the start position of the DIT is set to 1720ID. At step S401, dummy data is written from 700ID that is the last end of the above-described VSIT to 1719ID just before the start position of the DIT. At step S402, with data that has been created and stored in a predetermined memory or the like, a DIT with a size of 40ID is repeatedly written seven time from the start position of the DIT for 280ID.

As will be described later, step S402 is repeated a predetermined number of times when it has been determined that the write data of the DIT has an error. Thus, at step S402, the number of times of the retry process repeated is counted.

After the DIT has been written at step S402, the flow advances to step S403. At step S403, the DIT data is checked by the read-after-write process. Namely, it is determined whether or not the write data has an error.

When the determined result at step S403 is No (namely, the write data does not have an error), the flow advances to step S404. Steps S404 and S405 in this process are the same as steps S303 and S304 in the normal write process for the DIT, respectively. In other words, at step S404, dummy data is written for 600ID from 2000ID to 2599ID just before the start position of the user data. At step S405, the EOD is written from 2600ID that is the start position of the user data for 16ID. Thus, the write process for the DIT is completed.

On the other hand, at step S403, when the determined result at step S403 is Yes (namely, the write data has an error), the flow advances to step S406. As with the retry process for the VSIT, the upper limit of the number of times of the retry process has been assigned. At step S406, it is determined whether or not the number of times of the retry process performed becomes the maximum retry process (namely, the upper limit). When the number of times of the retry process becomes a predetermined number of times for example 10 times, the tape is treated as an improper tape for use.

Thus, when the determined result at step S406 is Yes (namely, the number of times of the retry process is the upper limit), as with the retry process for the VSIT, a message for informing the user that the tape cannot be used is issued and the retry process is terminated in the error state.

On the other hand, when the determined result at step S406 is No (namely, the number of times of the retry process is not the upper limit), the flow advances to step S402. At this point, the start position of the DIT that has been set at step S400 has not been changed from 1720ID and the similar write process for the DIT is performed.

After the retry process for the DIT has been completed, as with the normal write process for the DIT, the DIT is written to the tape as shown in FIG. 15. As was described in the related art reference, since the DIT has been written to the same position as before, when an error has taken place due to a scratch on the tape, the same error may occasionally take place in the DIT.

c. Retry Process for a VSIT According to Embodiment c1. Outlined Description

Figure 18:
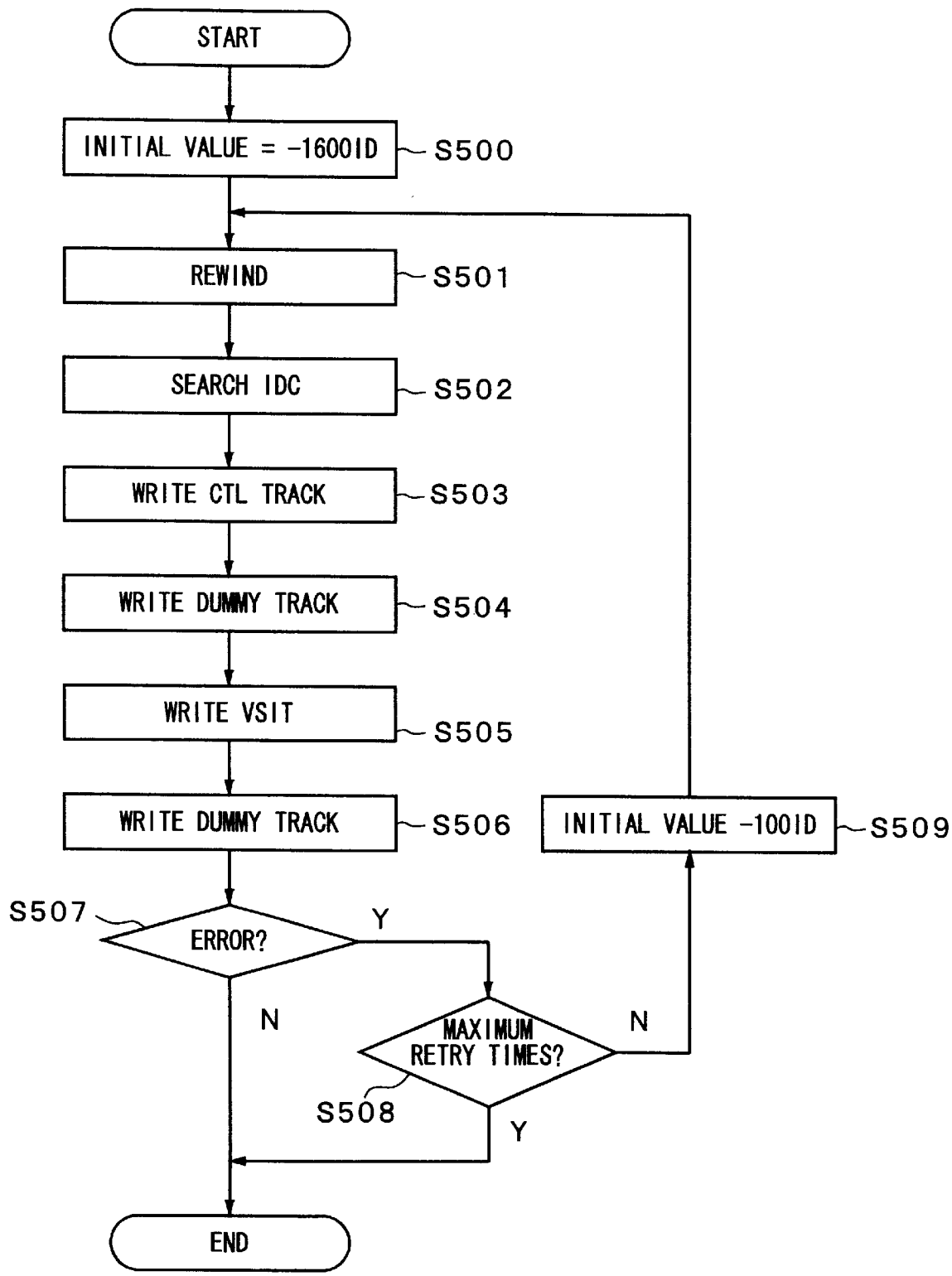
FIG. 18 is a flow chart showing a write retry process for a VSIT according to the present invention.

Next, an example of a write retry process for a VSIT according to an embodiment of the present invention will be described with reference to the accompanying drawings. FIG. 18 is a flow chart for explaining a write retry process for a VSIT according to an embodiment of the present invention. In the present invention, the write retry process for the VSIT is performed in such a manner that the start physical ID of the VSIT is always 0ID and the absolute position on the tape is varied. A VSIT that became an error is overwritten with dummy data.

Steps S500 to S505 in the flow chart are the same as corresponding steps in the flow chart for the normal write process for the VSIT (see FIG. 10) and those in the flow chart for the write retry process for the VSIT (see FIG. 13). At step S500, the initial value of the physical ID is set to −1600ID. Thereafter, the tape is rewound to the PBOT (at step S501). At step S502, the tape that has been rewound to the PBOT is fast forwarded for 7.7 meters (around 4000ID) by the IDC search process for a stable tape operation. The position apart from the PBOT for 4000ID is the initial value of the physical ID (namely, −1600ID) that has been set at step S500.

CTL data is written from −1600ID, which has been set as the initial value of the physical ID, to −401ID for 1200ID (at step S503). At step S504, dummy data is written from −400ID to −1ID. At step S505, VSIT data that has been stored in a memory or the like is repeatedly written 10 times from 0ID to 9ID.

As will be described later, step S505 is repeated a predetermined number of times when it has been determined that the write data of the VSIT has an error. Thus, at step S505, the number of times of the retry process performed is counted. The count value is stored by a predetermined storing means such as a RAM.

After the write process for the VSIT has been completed at step S505, the flow advances to step S506. At step S506, dummy data is written until 1100ID counted from −400ID. In this case, the dummy data is written from 10ID, which is the last end of the VSIT, to 699ID. After the dummy data has been written, the flow advances to step S507.

At step S507, the write result of the VSIT is checked by the read-after-write process and it is determined whether or not the write data has an error. When the determined result at step S507 is No (namely, the write data does not have an error), the write retry process for the VSIT is completed.

On the other hand, when the determined result at step S507 is Yes (namely, the write result has an error), the flow advances to step S508. In the retry process for the VSIT, the upper limit of the number of times of the retry process has been assigned. Although the number of times of the retry process is not theoretically limited, due to the restriction of the area to which the DIT is written or when the number of times of the retry process is too large, since the tape comes to the limit of the use, the upper limit is assigned. At step S508, it is determined whether or not the number of times of the retry process becomes the maximum retry times (namely, the upper limit) corresponding to the count value stored in the predetermined storing means. When the number of times of the retry process counted at step S505 becomes the predetermined number of times for example 10 times, the tape is treated as an improper tape for use.

Thus, when the determined result at step S508 is Yes (namely, the number of times of the retry process becomes the upper limit), a message for informing the user that the tape cannot be used is issued and the retry process is terminated in the error state.

On the other hand, when the determined result at step S508 is No (namely, the number of times of the retry process does not become the upper limit), the flow advances to step S509. At step S509, the initial value of the physical ID is newly set in such a manner that the initial value of the physical ID is decreased for 100ID. In other words, the initial value of the physical ID that is −1600ID against the position 4000ID apart from the PBOT is decreased for 100ID at step S509. Thus, the initial value of the physical ID becomes −1700ID. This process is performed by setting the initial value of the time code written to the CTL track to −1700ID.

In such a manner, the initial value of the physical ID is decreased for 100ID at step S509. Thereafter, the flow returns to step S501. Thus, the above-described steps are repeated. In other words, at step S501, the tape is rewound to the PBOT. At step S502, the tape is fast forwarded to 400ID by the IDC search process. The position 4000ID corresponds to the initial value of the physical ID. The position −1700ID, which has been set at step S509, becomes the initial value.

CTL data is written from −1700ID to −501ID for 1200ID. In other words, as described above, since the initial value of the time code written to the CTL track is −1700ID, the value of the time code is simply increased and written. At step S504, dummy data is written from −50ID to −1ID.

After the dummy data has been written until −1ID, at step S505, the VSID is repeatedly written 10 times from 0ID to 9ID. At step S506, dummy data is written until 1100ID counted from −500ID. In other words, in this case, the dummy data is written from 10ID just after the VSIT to 599ID. After the dummy data has been written, the flow advances to step S507. At step S507, it is determined whether or not the VSIT has an error. When the determined result at step S507 is No (namely, the VSIT does not have an error), the retry process is completed. When the VSIT has an error and the number of times of the retry process does not become the upper limit, the flow advances to step S509. At step S509, the initial value of the physical ID is decreased for 100ID and the initial ID becomes −1800ID. Thereafter, the flow returns to step S501. The loop starting from step S501 is repeated until the VSIT does not have an error or the number of times of the retry process becomes the upper limit.

Figure 19A:
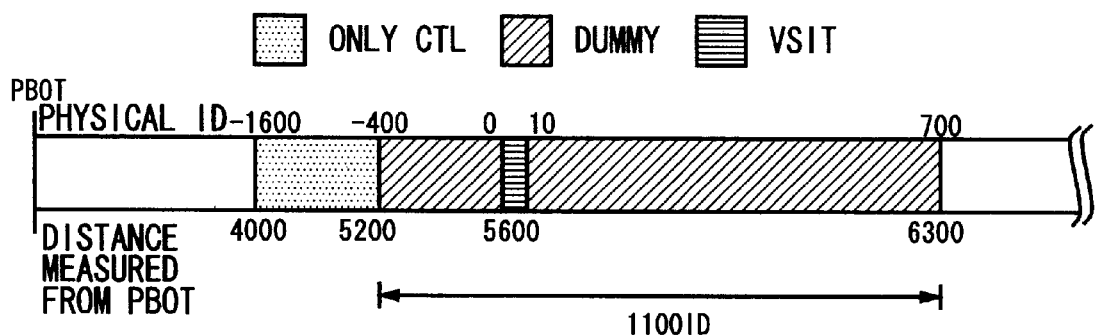
FIGS. 19A–C are diagrams to which reference will be made in explaining the state of a tape in the case that a write process for a VSIT and a write retry process thereof have been performed.

FIG. 19A is a schematic diagram showing the state of a tape in the case that a normal write process for a VSIT has been performed. In FIG. 19A, the left end represents the PBOT. The right end represents the PEOT. The state of the tape shown in FIG. 19A is the same as that in which the normal write process for the VSIT has been performed. In other words, the position 4000ID measured from the PBOT is equivalent to the initial value −1600ID of the physical ID. Only the CTL is written from −1600ID to −399ID of the physical ID. Dummy data is written until −1ID. The VSIT is written from 0ID to 9ID. Dummy data is also written from 10ID to 699ID. The position 0ID at the start position of the VSIT is equivalent to the position 5600ID measured from the PBOT.

Figure 19B:
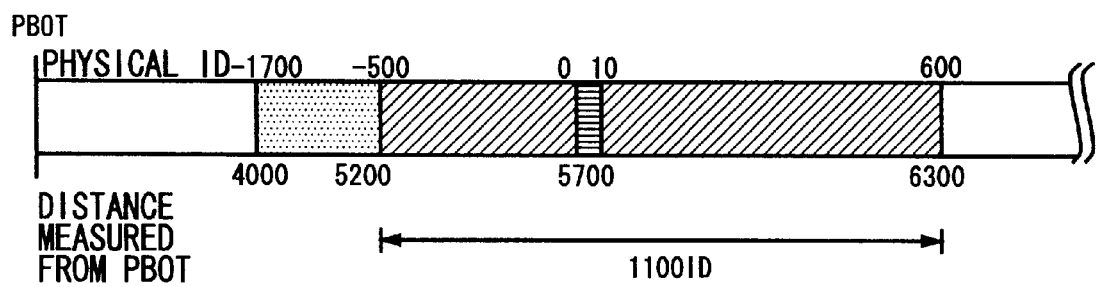

FIG. 19B is a schematic diagram showing the state of a tape in the case that after an error has taken place in the VSIT, the above-described retry process has been performed one time. At this point, the position 4000ID measured from the PBOT is equivalent to the initial value −1700ID of the physical ID that is smaller than that in the normal write process for the VSIT by 100ID. In other words, as was described above, the initial value of the time code written to the CTL track becomes −1700ID.

Only the CTL track is written from −1700ID to −499ID for 1200ID. Dummy data is written from −500ID to −1ID. The VSIT is written from 0ID to 9ID. In this case, the position 0ID at the start position of the VSIT is equivalent to the position 5700ID measured from the PBOT. Dummy data is written after 10ID. In other words, the dummy data is written from −500ID to 599ID for 1100ID.

Figure 19C:
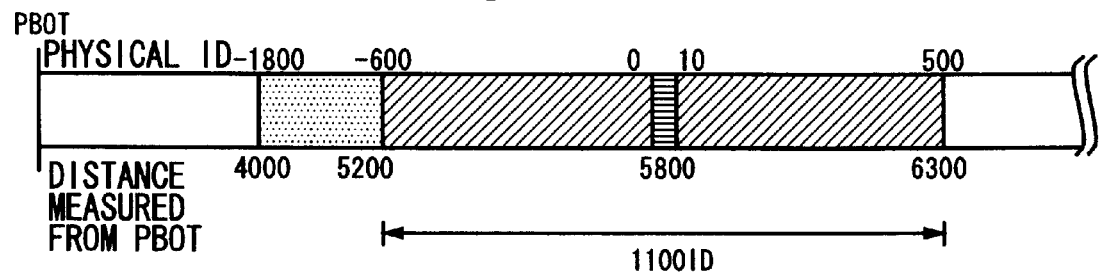

FIG. 19C is a schematic diagram showing the state of a tape in the case that an error has taken place in the first time retry process and then the second retry process has been performed. In this case, the physical ID in the second retry process is smaller than the physical ID in the first retry process for 100ID. In the other words, the position 4000ID measured from the PBOT is equivalent to the initial value −1800ID of the physical ID. As with the first time retry process, the initial value of the time code written to the CTL track is −1800ID.

Only the CTL track is written from −1800ID to −599ID. Dummy data is written from −600ID to −1ID. The VSIT is written from 0ID to 9ID. In this case, the position 0ID of the physical ID is equivalent to the position 5800ID measured from the PBOT. A dummy track is written from 10ID to 499ID of the physical ID on the PEOT side for 1100ID.

The third or later write retry process for the VSIT is performed in the same manner. Thus, the initial value of the physical ID is decreased for 100ID.

Thus, according to the present invention, when the write retry process for the VSIT is performed, the physical ID of the start position of the VSIT is not changed. Instead, the real write position (namely, the distance measured from the PBOT) is varied. In this example, when the retry process is performed, the write position of the VSIT is moved for 100ID in the direction of the PEOT. Thus, even if an error has taken place in the VSIT due to a scratch of the tape, with the retry process, the VSIT can be written without an error.

The moving amount for 100ID is assigned so as to absorb an error in the IDC search process. Thus, the moving amount is not limited to 100ID.

In addition, after the normal write process for the VSIT has been performed, the physical ID of the last end of the area of the VSIT and the guard track thereof is 699ID. After the first time retry process, the second time retry process, and so forth have been performed, the physical ID decreases thereof are changed to 599ID, 499ID, and so forth although the distance measured from the PBOT does not vary.

In the case that data has been written after the last end of the area of the VSIT and the guard track thereof, when the physical ID at the last end is decreased, the ID value may not be continuous to the physical ID at the start position of the track. However, as long as the physical ID values simply increase from the PBOT to the PEOT, the discontinuity of the ID values does not result in any problem. In other words, the physical ID 600ID can be followed by the physical ID 701ID.

c2. Detailed Description of Process

Next, with reference to the accompanying drawings, a write retry process for a VSIT according to the present invention will be described in detail. The description of this part is applied for the apparatus explained in "a. Magnetic tape apparatus according to the present invention." (see FIGS. 3 and 9).

Figure 20:
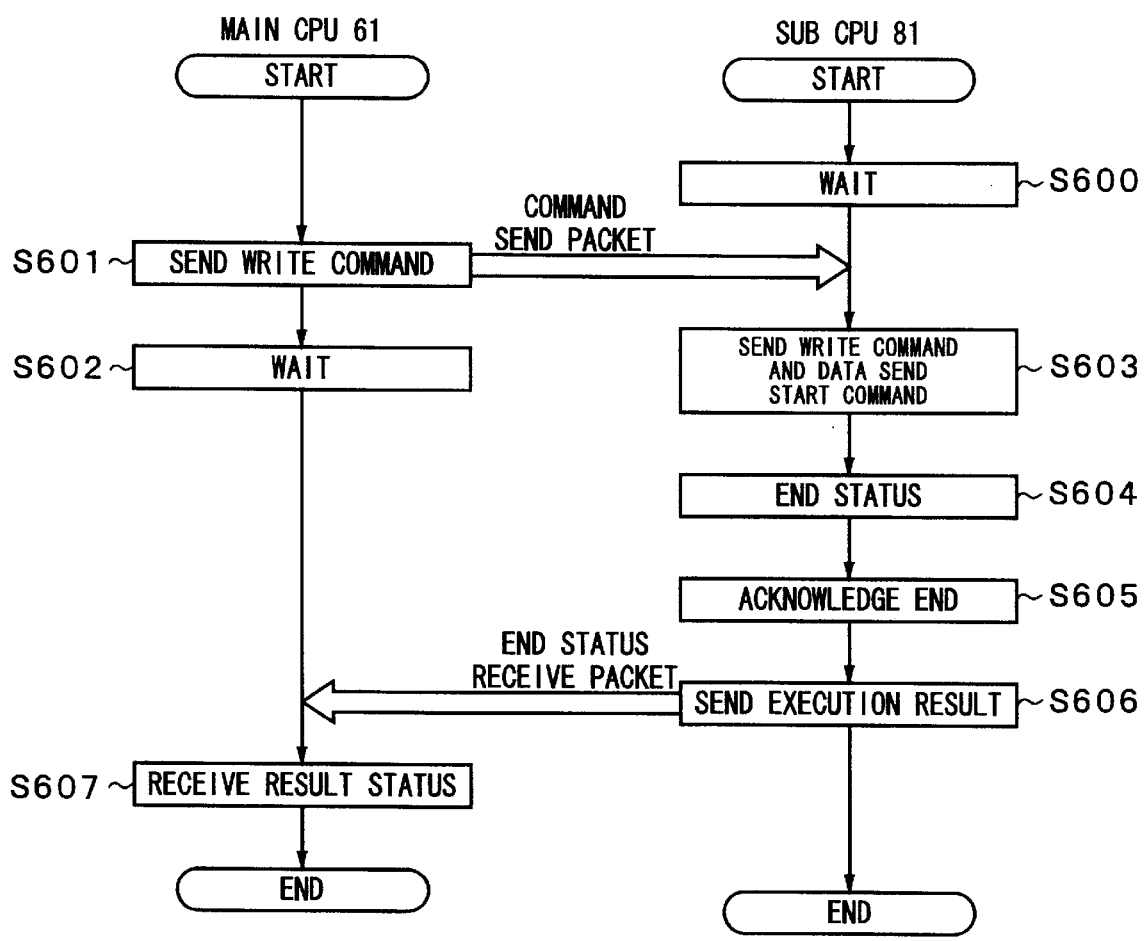
FIG. 20 is a flow chart showing a write process for data on a magnetic tape.

For easy understanding of the present invention, a data write process for data on a magnetic tape by the above-described apparatus will be described. FIG. 20 is a flow chart showing the write process. The flow chart also show processes performed by the main CPU 61 and the sub CPU 81. As was described above, information is exchanged between the main CPU 61 and the sub CPU 81 with five types of command packets, which are a command send packet, an end status receive packet, a command status, a drive management status table, and a data send/receive packet.

First, the sub CPU 81 waits until a command send packet is received from the main CPU 61 (at step S600). When data to be written such as dummy track data and VSIT track data is stored in the bank memory 80, a write command for a dummy track is sent from the main CPU 61 to the sub CPU 81 through the two-port RAM 70 (at step S601). When the main CPU 61 receives the command, it waits until an end status receive packet is received from the sub CPU 81 (at step S602). When the command is received by the two-port RAM 70, it sends a command send packet to the sub CPU 81.

When the command send packet is received by the sub CPU 81, a data write command is sent to the system controller 46 of the digital information recorder portion 1 through the RS422 interface 87. In addition, a data send start command is sent to the DMA controller 89 (at step S603). When the DMA controller 89 receives the command, it starts sending data received from the bank memory 80 to the drive controller 34 of the digital information recorder portion 2. Thus, the data is written to the tape.

After the track data stored in the bank memory 80 has been sent, a message that represents this state is sent from the system controller 46 to the DMA controller 89 through the RS422 interface 87. The DMA controller 89 sends status data that represents the completion of the data transmission to the sub CPU 81 (at step S604). Thus, the sub CPU 81 acknowledges the completion of the write process (at step 605). The execution result is sent to the two-port memory 70 (at step S606). Thereafter, the sub CPU 81 waits until a command send packet is received from the main CPU 61.

The execution result sent to the two-port RAM 70 is read by the DMA controller 89. An end status receive packet is sent to the main CPU 61. The CPU 61 receives the end status receive packet at step S607. Thus, the first write process is completed. In the write process, time codes are written to the CTL track along with the helical tracks in the predetermined method.

Figure 21:
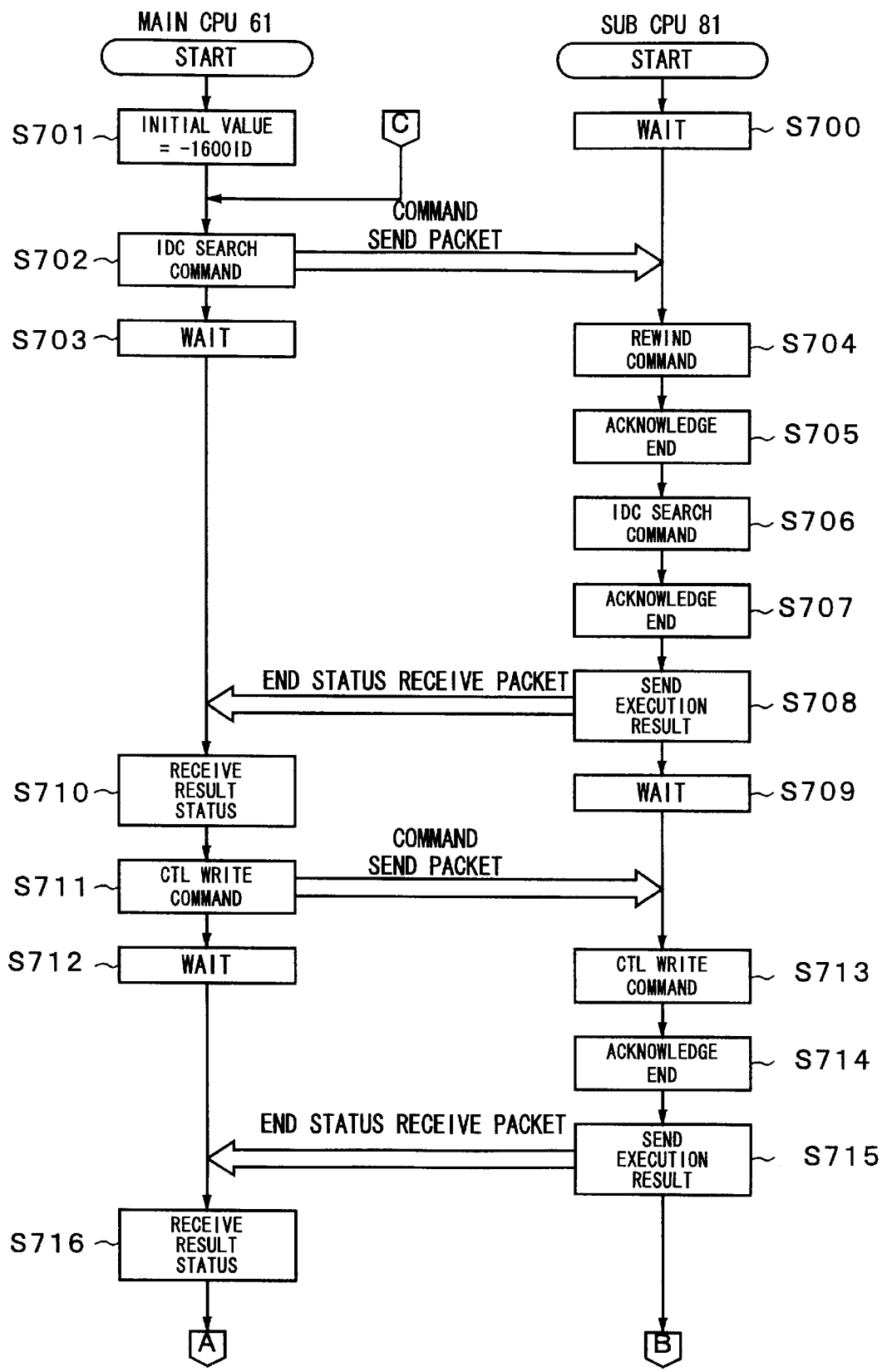
FIG. 21 is a flow chart showing a write process for a VSIT including a write retry process.
Figure 22:
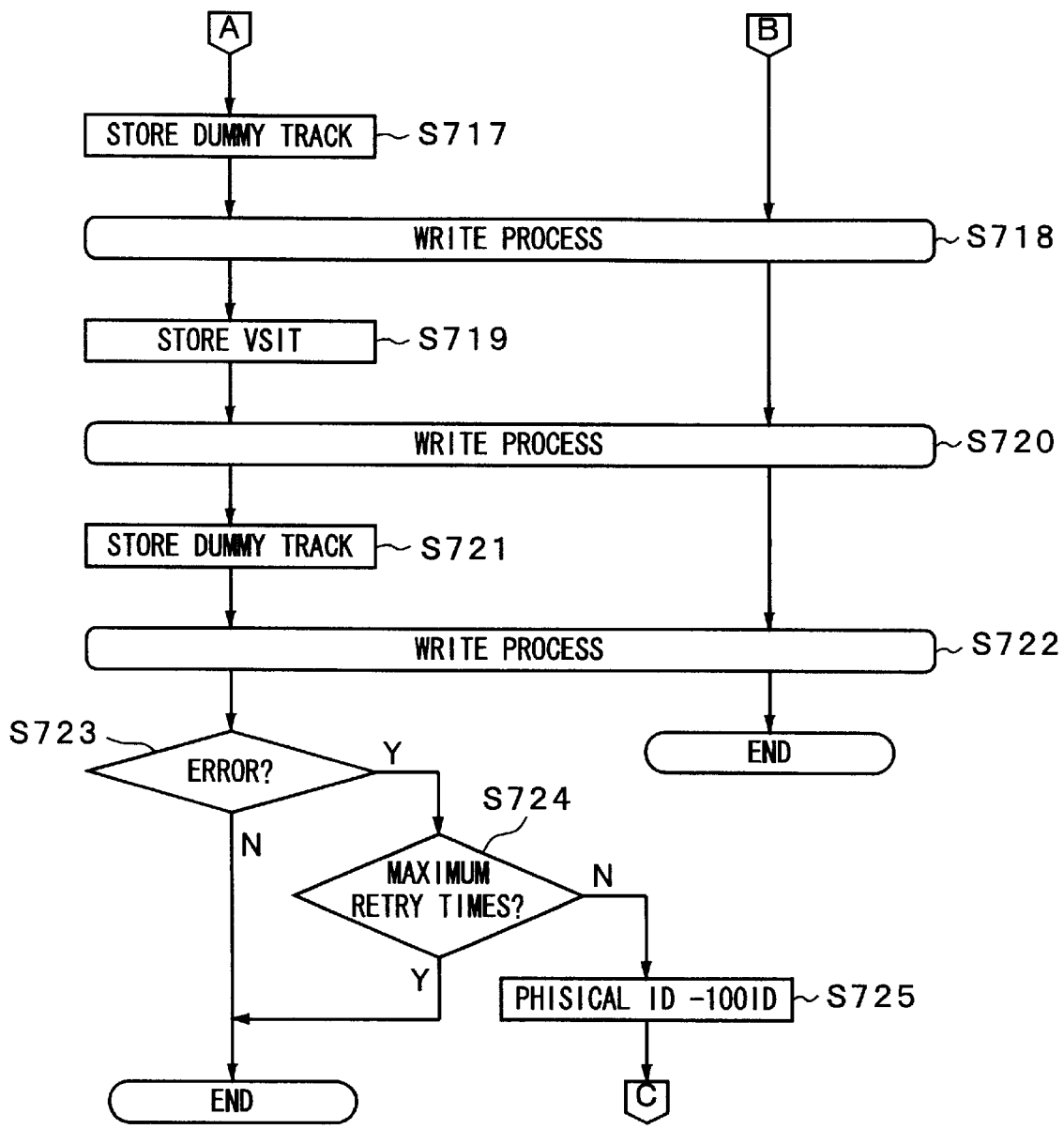
FIG. 22 is a flow chart showing a write process for a VSIT including a write retry process.

FIGS. 21 and 22 are flow charts showing a write process for a VSIT including a retry process thereof. First, the sub CPU 81 waits until a command send packet is received from the main CPU 61 (at step S700). The main CPU 61 sets the physical ID (namely, the initial value of the time code written to the CTL track) to −1600ID (at step S701). This initial value is stored in a predetermined area of the RAM 71 through the CPU bus 62.

At step S702, an IDC search command for 400ID is sent from the main CPU 61 to the sub CPU 81 through the two-port RAM 70. The main CPU 61 waits until an end status receive packet that represents the completion of the command is received from the sub CPU 81 (at step S703). On the other hand, a command send packet that contains a sequence of commands for the IDC search command is sent from the two-port RAM that has received the IDC search command to the sub CPU 81.

The sub CPU 81 that has received the command send packet sends a tape rewind command to the system controller 46 of the digital information recorder portion 2 through the RS422 interface 87 (at step S704). With the tape rewind command, the system controller 46 controls the mechanism controller 48, the motor drive 49, and the motor 50 so that the tape is rewound to the PBOT. The result of the rewinding process is sent from the system controller 46 to the sub CPU 81 through the RS422 interface 87. The sub CPU 81 acknowledges this state (at step S705).

After the sub CPU 81 has acknowledged the state, an IDC search command is sent corresponding to the content of the command send packet for the IDC search process (at step S706). The command is received by the system controller 46 through the RS422 interface 87. With the command, the system controller 46 controls the mechanical controller 48, the motor drive 49, and the motor 50 so as to execute the IDC search process. In this example, as was described above, the tape is forwarded from the PBOT of the tape for 400ID by the IDC search process.

After the IDC search process has been completed, status data that represents the completion of the IDC search process is sent to the sub CPU 81 through the RS422 interface 87. The CPU 81 that has received the status acknowledges the completion of the IDC search process (at step S707). Thereafter, the result status data of the IDC search process is sent to the two-port RAM 70. The result status data sent to the two-port RAM 70 is read by the DMA controller 89. At step S708, the result status data is sent as an end status receive packet to the main CPU 61. After the end status receive packet has been sent, the sub CPU 81 waits until the next command send packet is sent from the main CPU 61 (at step S709).

At step S710, the result status data contained in the end status receive packet is received by the main CPU 61. Thus, a command for writing a time code for 1200ID to the CTL track is sent from the main CPU 61 to the two-port RAM 70. The time code is written corresponding to the initial value of the physical ID (namely, the initial value of the time code being written to the CTL track). Thus, at this point, the initial value −1600ID of the physical ID stored in a predetermined area of the RAM 71 is read from the RAM 71 and sent to the two-port RAM 70.

The CTL track write command and the initial value −1600ID are sent as a command send packet to the sub CPU 81. After the command send packet has been sent, the main CPU 61 waits until an end status receive packet is send from the sub CPU 81 (at step S712).

When the command send packet is received by the sub CPU 81, at step S713, a CTL track write command and the initial value −1600ID of the time code are sent from the sub CPU 81 to the system controller 46 through the RS422 interface 87. When the write command and the initial value of the ID are received by the system controller 46, the time code is recorded to the CTL track corresponding to the received information.

For example, one of the two CPUs of the system controller 46 controls the mechanism controller 48, the motor drive 49, and the motor 50. The other CPU generates a time code in such a manner that the ID simply increase from −1600ID as the initial value. The time code is sent to the fixed head 47 and the time code is recorded to the CTL track of the tape.

When the time code is recorded for a predetermined length (1200ID in this case), result status data that represents the completion of the write process is sent from the system controller 46 to the sub CPU 81 through the RS422 interface 87. Thus, the sub CPU that has received the result status data acknowledges the completion of the write process (at step S714). After the sub CPU has acknowledged this state, the result status data of the write process is sent to the two-port RAM 70. The result status data sent to the two-port RAM 70 is read by the DMA controller 89. At step S715, the result status data is sent as an end status receive packet to the main CPU 61. After the end status receive packet has been sent, the sub CPU 81 waits until the next command is sent from the main CPU 61.

At step S716, the result status data contained in the end status receive packet is received. At step S717, dummy track data is stored in the bank memory 80. At step S718, the dummy data stored in the bank memory 80 is written to the tape. At step S718, the write process corresponding to the flow chart shown in FIG. 20 is performed. To prevent redundancy, the description of the write process is omitted.

The dummy data is written from the ID just following the CTL track written at step S713 to −1ID. In this case, since the CTL track is written from the initial value −1600ID of the physical ID to −401ID for 1200ID, dummy data is written from −400ID to −1ID.

After the write process has been completed at step S718, the flow advances to step S719. At step S719, VSIT track data is stored in the bank memory 80. At step S720, the VSIT track data stored in the bank memory 80 is written to the tape corresponding to the flow chart shown in FIG. 20. In this case, the VSIT track data that has a length of 1ID is repeatedly written 10 times from 0ID to 9ID. At step S720, the process of which the VSIT track data is written 10 times from 0ID to 9ID is performed as one write process for the VSIT. The number of times of the write process for the VSIT is counted. The count value is stored by a predetermined storing means such as a RAM.

In the write process for the VSIT at step S720, the write result is checked by the read-after-write process. At this point, if the write result has an error, error occurrence status information that represents the occurrence of the error is stored in the predetermined storing means such as the RAM.

After the VSIT has been written, the flow advances to step S721. At step S721, dummy track data is stored in the bank memory 80. At step S722, the dummy track data stored in the bank memory 80 is written to the tape. At this point, the write process is started just after the last position of the VSIT. The dummy data is written from the start position of the dummy data written at step S718 for 1100ID. In this example, at step S718, the dummy data has been written from −400ID. Thus, the dummy data is written from 10ID to 699ID.

After the write process for the dummy data has been completed at step S722, the flow advances to step S723. At step S722, it is determined whether or not the VSIT has an error corresponding to the error occurrence status stored at step S720. When the determined result at step S723 is No (namely, the VSIT does not have an error), the write process for the VSIT is completed.

Figure 23A:
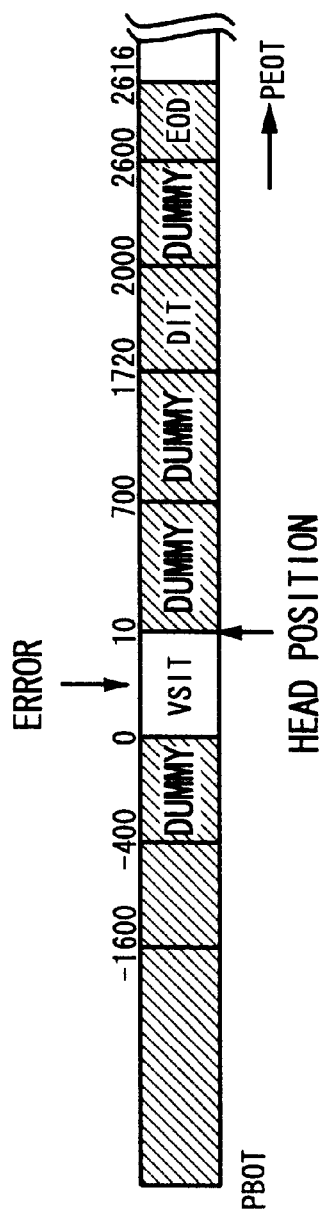
FIGS. 23A–G are diagrams to which reference will be made in explaining the relation between a rotating head and a tape at each step of the retry process.

On the other hand, when the determined result at step S723 is Yes (namely, the VSIT has an error), the flow advances to step S724. FIG. 23 shows the relation between the tape and the rotating head at each step in the case that the VSIT has an error and the retry process is performed. FIG. 23A shows the position of the head in the case that the VSIT has an error.

As was described above, in the flow chart of the write process for the VSIT, the number of times of the write process for the VSIT performed at step S720 is counted. As will be described later, the number of times of the write process for the VSIT is counted. The upper limit of the number of times of the write process is assigned. At step S724, it is determined whether or not the number of times of the write process becomes the maximum number of times of the retry process.

When the determined result at step S724 is Yes (namely, the number of times of the write process becomes the maximum retry times), since the tape is treated as an improper tape for use, the write process for the VSIT is terminated in the error state. At this point, a message for informing the user of this state may be issued through the user interface.

At step S724, when the determined result at step S724 is No (namely, the number of times of the write process does not become the maximum retry time), the flow advances to step S725. At step S725, the retry process is performed. At step S725, the initial value of the current physical ID is decreased for 100ID. In this example, the initial value of the current physical ID is −1600ID that has been set at step S701. Thus, since −1600ID −100ID, the initial value of the physical ID becomes −1700ID. Consequently, the physical ID is decreased for 100ID. Thereafter, the flow returns to step S702.

In the flow chart of the retry process, steps from S702 to S710 (after an IDC search command is sent at step S702 until result status data of the IDC search process is received at step S710) are the same as steps S702 to S710 (before the retry process is performed). In other words, an IDC search command is sent as a command send packet from the main CPU 61 to the sub CPU 81 through the two-port RAM 70 (at step S702). After the CPU 61 has sent the IDC search command, it enters the wait state (at step S703).

Figure 23B:
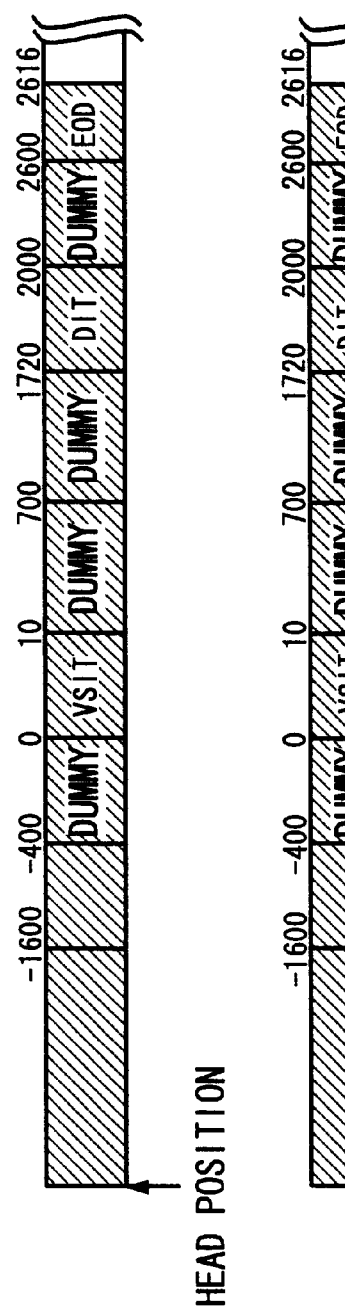

At step S704, a rewind command is sent from the sub CPU 81 to the system controller 46 through the RS422 interface 87. With the command, the system controller 46 causes the tape to be rewound to the PBOT. FIG. 23B shows the position of the head at the point. After the tape has been rewound, status data that represents the completion of the rewinding process is sent from the system controller 46 to the sub CPU 81 through the RS422 interface 87. The sub CPU 81 acknowledges the completion of the rewinding process (at step S705). At step S706, an IDC search command is sent from the sub CPU 81 to the system controller 46 through the RS422 interface.

Figure 23C:
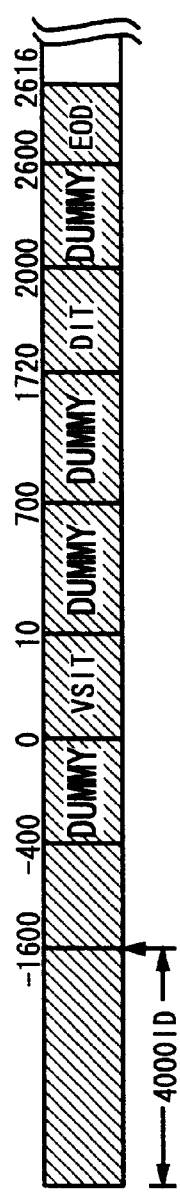

With the IDC search command, the system controller 46 searches the distance from the PBOT of the tape for 4000ID by the IDC search process. FIG. 23C shows the position of the head at this point. After the IDC search process has been completed, status data that represents the completion of the IDC process is sent from the system controller 46 to the sub CPU 81 through the RS422 interface 87. The sub CPU 81 acknowledges the completion of the IDC search process (at step S707). After all the contents of the command send packet sent from the main CPU 61 have been executed, result status data that represents the execution result is sent as an end status receive packet from the sub CPU 81 to the main CPU 61 through the two-port RAM 70.

At step S710, the result status contained in the end status receive packet sent from the two-port RAM 70 is received by the main CPU 61. Thus, a command for writing a time code for 1200ID to the CTL track is sent from the main CPU 61 to the two-port RAM 70. In the retry process, at step S725, a new initial value of the physical ID is assigned in such a manner that 100ID is decreased from the initial value of the current physical. The time code is written corresponding to the new initial value. In other words, the initial value −1700ID of the newly assigned physical ID is sent to the two-port RAM 70 along with a time code write command (at step S711).

The CTL track write command and the new initial value −1700ID are sent as a command send packet to the sub CPU 81. Thus, the main CPU 61 enters the wait state (at step S712).

Figure 23D:
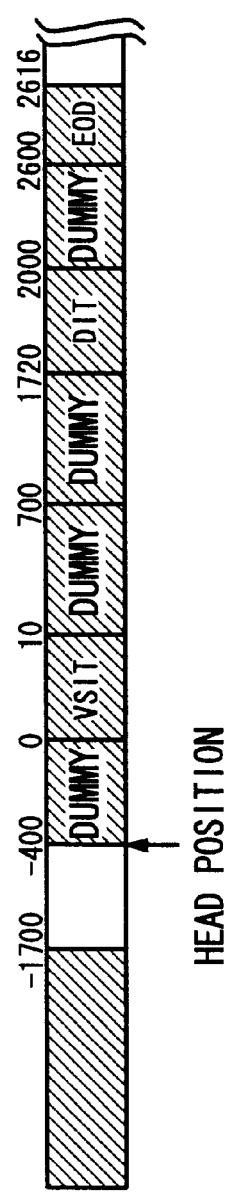

When the command send packet is received by the sub CPU 81, at step S713, the CTL track write command and the initial value −1700ID of the time code are sent from the sub CPU 81 to the system controller 46 through the RS422 interface 87. When the write command and the initial value of the physical ID are received by the system controller 46, the time code is recorded to the CTL track in such a manner that the ID values simply increase with the initial value −1700ID of the new ID. FIG. 23D shows the position of the head in the case that the time code has been written to the CTL track.

After the time code for 1200ID has been recorded, result status data that represents the completion of the time code is sent from the system controller 46 to the sub CPU 81 through the RS422 interface 87. Thus, the sub CPU that has received the status data acknowledges the completion of the write process (at step S714). The result status of the write process for the CTL track is sent as an end status receive packet to the main CPU 61 through the two-port RAM 70 (at step S715). After the end status receive packet has been sent, the sub CPU 81 waits until the next command send packet is sent from the main CPU 61.

At step S716, when the result status data contained in the end status receive packet has been received, the flow advances to step S717. At step S717, dummy track data is stored in the bank memory 80. At step S718, the write process for the dummy data is performed corresponding to the flow chart shown in FIG. 20.

Figure 23E:
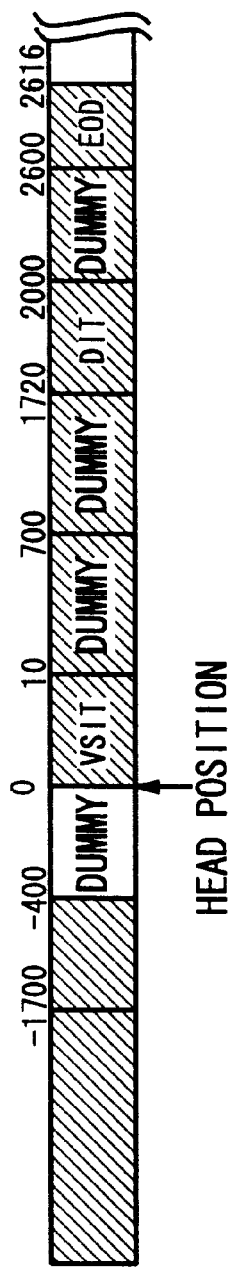

The dummy data is written from the ID just following the CTL track written at step S713 until −1ID. In this case, the initial value of the physical ID is a new value. The time code is written to the CTL track from −1700ID to −501ID for 1200ID. Thus, dummy data is written from −500ID to −1ID. FIG. 23E shows the position of the head in the case that the dummy data has been written.

After the write process has been completed at step S718, the flow advances to step S719. VSIT track data is stored in the bank memory 80. At step S720, the write process for the VSIT track data to the tape is performed corresponding to the flow chart shown in FIG. 20. In this case, the VSIT with a length of 1ID is repeatedly written 10 times from 0ID to 9ID.

Figure 23F:
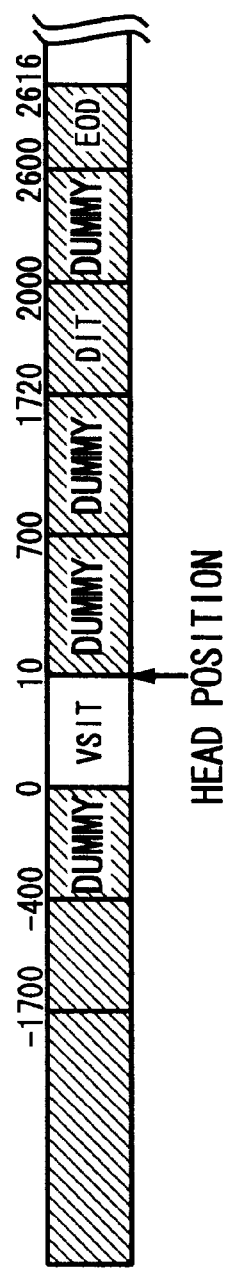

As described above, although the distance measured from the PBOT is fixed, whenever the retry process is performed, the initial value of the physical ID is decreased for 100ID. Thus, whenever the retry process is performed, the VSIT written from 0ID is moved for 100ID in the direction of the PEOT. FIG. 23F shows the position of the head at this point.

At step S720, the number of times of a process for repeatedly writing the VSIT track 10 times from 0ID to 9ID is counted. This count value is added to the count value stored in a predetermined storing means such as a RAM.

When the write process for the VSIT is performed at step S720, the write result is checked by the read-after-write process. At this point, if the write data of the VSIT has an error, error occurrence status information that represents the occurrence of the error is stored in the predetermined storing means.

Figure 23G:

After the VSIT has been written, the flow advances to step S721. At step S721, dummy track data is stored in the bank memory 80. At step S722, the dummy track data is written to the tape corresponding to the flow chart shown in FIG. 20. At this point, dummy data is written just after the VSIT from the start position of the dummy data written at step S718 for 110ID. In this example, since dummy data has been written from −500ID at step S718, dummy data is written from 10ID to 599ID. FIG. 23G shows the position of the head at this point.

When the write process for the dummy data has been completed at step S722, the flow advances to step S723. Corresponding to the error occurrence status data stored at step S720, it is determined whether or not the write data of the VSIT has an error. When the determined result at step S723 is No (namely, the write data does not have an error), the write process for the VSIT and the retry process thereof are completed.

On the other hand, when the determined result at step S723 is Yes (namely, the write data of the VSIT has an error), the flow advances to step S724. At step S724, it is determined whether or not the number of times of the write process becomes the maximum retry times corresponding to the count value stored in the predetermined storing means.

When the determined result at step S724 is Yes (namely, the number of times of the retry process becomes the maximum retry times), the tape is treated as an improper tape for use and the write process for the VSIT is terminated in the error state.

On the other hand, when the determined result at step S724 is No (namely, the number of times of the retry process does not become the maximum retry times), the flow advances to step S725. At step S725, the retry process is performed again. As with the first time retry process, at step S725, the initial value of the physical ID is decreased for 100ID. In this example, the initial value of the current physical ID is −1700ID that has been set at step S725. Thus, since the initial value −1700ID is decreased for −100ID, the initial value of the new physical ID becomes −1800ID. Thereafter, the flow returns to step S702.

The loop starting from step S702 is continued until the write data of the VSIT does not have an error or the number of times of the retry process becomes the upper limit. Whenever the retry process is performed, the initial value of the physical ID is decreased for 100.

d. Retry Process for a DIT According to Embodiment d1. Outlined Description

Figure 24:
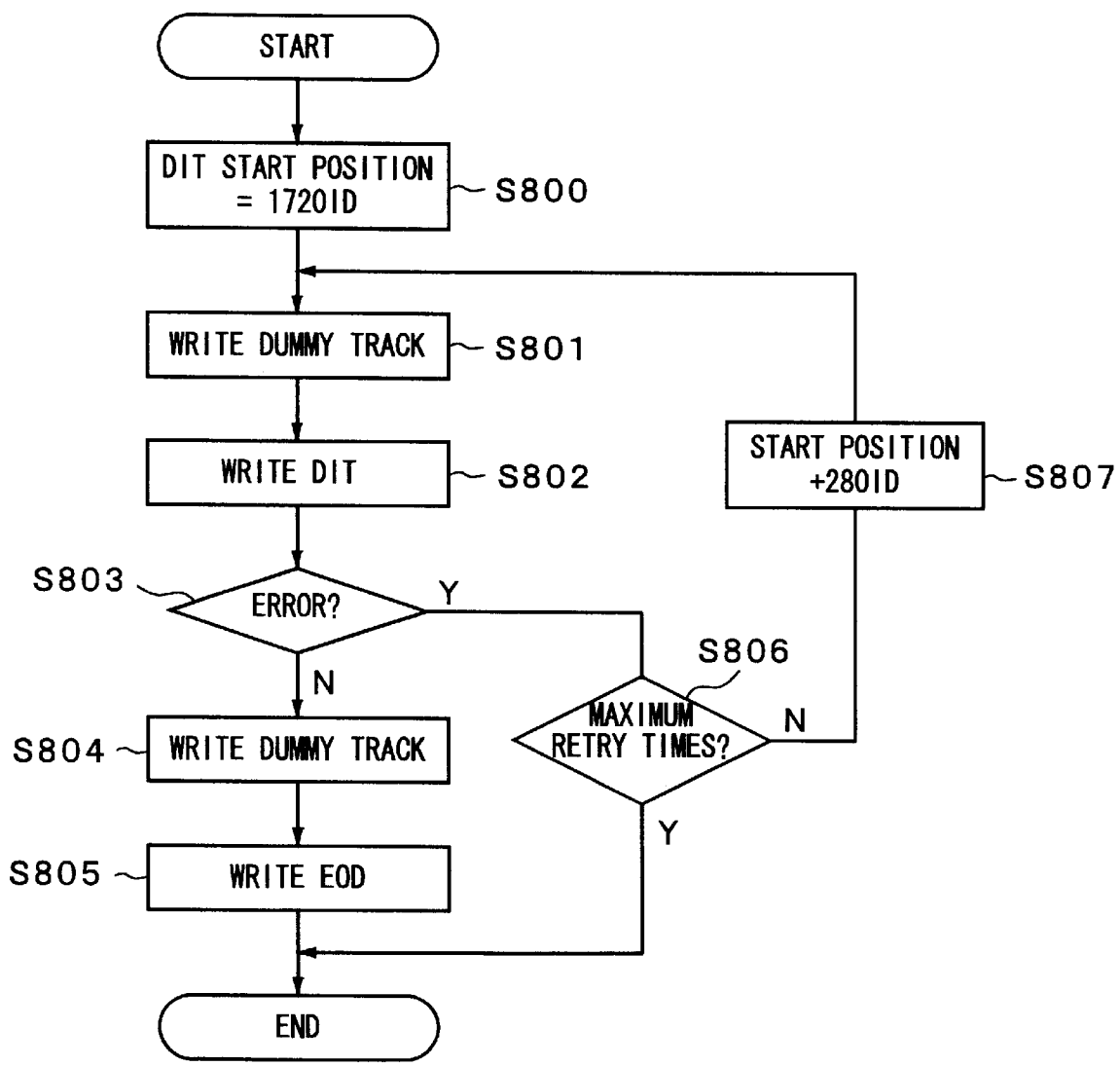
FIG. 24 is a flow chart showing a write retry process for a DIT according to the present invention.

Next, with reference to the accompanying drawings, an example of a write retry process for a DIT according to an embodiment of the present invention will be described. FIG. 24 is a flow chart showing a write retry process for a DIT according to an embodiment of the present invention. According to the present invention, a DIT that has an error is overwritten with dummy data. A new DIT is rewritten at an area adjacent to the dummy data in the PEOT direction. At this point, the physical ID of the DIT is also changed.

In the case that the write data of the DIT does not have an error and thereby a retry process does not take place, the flow chart showing the write retry process for the DIT (shown in FIG. 17) is applied.

At step S800, the start position of the DIT is set to 1720ID. At step S801, dummy data is written from 700ID, that is the last end of the above-described VSIT, to 1719ID just before the DIT. With data of the DIT stored in the predetermined memory or the like, at step S802, the DIT with a length of 40ID is repeatedly written seven times for 280ID.

At step S802, the DIT data is checked by the read-after-write process. The check result is stored in a predetermined storing means such as a RAM.

As will be described later, steps S802 and S801 are repeated a predetermined number of times when it has been determined that the write data of the DIT has an error. Thus, at step S802, the number of times of the process at step S802 is counted. The count value is stored in a predetermined storing means such as a RAM.

After the DIT has been written at step S802, the flow advances to step S803. At step S803, it is determined whether or not the write data of the DIT has an error corresponding to the check result stored in the predetermined storing means at step S802.

When the determined result at step S803 is No (namely, the write data of the DIT does not have an error), the flow advances to step S804. At step S804, dummy data is written just after the DIT written at step S802 (namely, from 2000ID to 2599ID just before the start position of user data). At step S805, an EOD is written from 2600ID, which is the start position of the user data, for 16ID. Thus, the write process for the DIT is completed.

On the other hand, when the determined result at step S803 is Yes (namely, the write data of the DIT has an error), the flow advances to step S806. As with the retry process for the VSIT, in the retry process for the DIT, the upper limit of the number of times of the retry process has been assigned. Although there is no theoretical limitation of the number of times of the retry process, due to the restriction of the area to which the DIT can be written or when the number of times of the retry process is too large, it is determined that the tape comes to the limit of the use. At step S806, it is determined whether or not the number of times of the retry process becomes the maximum retry times (namely, the upper limit) corresponding to the count value stored in the predetermined storing means. When the number of times of the retry process becomes a predetermined number of times (for example, 10 times), the tape is treated as an improper tape for use.

Thus, when the determined result at step S806 is Yes (namely, the number of times of the retry process becomes the upper limit), as with the retry process for the VSIT, the retry process is terminated in the error state.

On the other hand, when the determined result at step S806 is No (namely, the number of times of the retry process does not become the upper limit), the flow advances to step S807. As described above, according to the present invention, when the write retry process for the DIT is performed, a new DIT is newly rewritten in an area adjacent to the current DIT in the PEOT direction of the tape. In other words, the start position of the DIT is moved for 280ID in the direction of the PEOT of the tape. Thus, at step S807, the start position of the DIT is changed so that 280ID is added to the physical ID of the start position of the current DIT. In this example, since the retry process is performed one time, the start position of the DIT is 1720ID that has been set at step S800. Thus, the start position of the new DIT becomes 1720ID+280ID=2000ID.

At step S807, when the start position of the DIT is changed, the flow returns to step S801. Dummy data is written from 700ID, which is the last end of the VSIT, to 1999ID just before the start position that has been changed at step S807. At step S802, the DIT with a length of 40ID is repeatedly written seven times from the start position of the DIT, which has been changed, for 280ID. The write result of the DIT is checked by the read-after-write process and then stored in a predetermined storing means. The number of times of the process at step S802 is counted. This count value is added to the count value stored in the predetermined storing means.

After the DIT has been written at step S802, the flow advances to step S803. At step S803, it is determined whether or not the write data of the DIT has an error corresponding to the check result of the DIT at step S802.

When the determined result at step S803 is No, the flow advances to step S804. At step S804, dummy data is written just after the DIT that has been written at step S802 (namely, from 2280ID to 2599ID, just before the start position of user data). At step S805, the EOD is written from 2600ID, which is the start position of the user data, for 16ID. Thus, the write retry process for the DIT is completed.

On the other hand, when the determined result at step S803 is Yes (namely, the write data of the DIT has an error), the flow advances to step S806. At step S806, it is determined whether or not the number of times of the retry process for the DIT exceeds the upper limit of the number of times of the retry process (namely, the maximum retry times). In other words, when the number of times of the retry process counted at step S802 becomes a predetermined number of times (for example, 10 times), the tape is treated as an improper tape for use. Thus, when the determined result at step S806 is Yes (namely, the number of times of the retry process becomes the upper limit), the retry process is terminated in the error state.

On the other hand, when the determined result at step S806 is No (namely, the number of times of the retry process does not become the upper limit), the flow advances to step S807. At step S807, the start position of the new DIT is set so that 280ID is added to the start position of the current DIT. Thereafter, the flow returns to step S801. At step S801, the write retry process for the DIT is performed.

The loop process starting from step S801 is repeated until the write data of the DIT does not have an error at step S802 or it has determined that the number of times of the retry process becomes the maximum retry times at step S806.

Figure 25A:
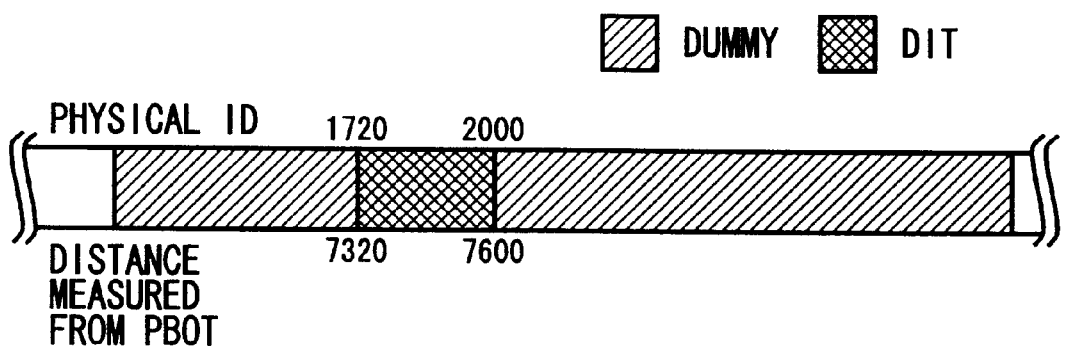
FIGS. 25A–C are diagrams to which reference will be made in explaining is the state of a tape in the case that a write process for a DIT and a write retry process thereof have been performed.

FIG. 25A shows the state of a tape in the case that a normal write process for a DIT has been performed. In FIG. 25A, the left end represents the PBOT. The right end represents the PEOT. This state is the same as the state in the case that the normal write process for the DIT has been performed as shown in FIG. 16. In other words, the start position of the DIT is 7320ID measured from the PBOT that is equivalent to 1720ID of the physical ID. The DIT with a length of 40ID is repeatedly written seven times from 1720ID to 1999ID for 280ID. Both sides of the area of the DIT (namely, before 1720ID and after 1999ID) are dummy tracks.

Figure 25B:
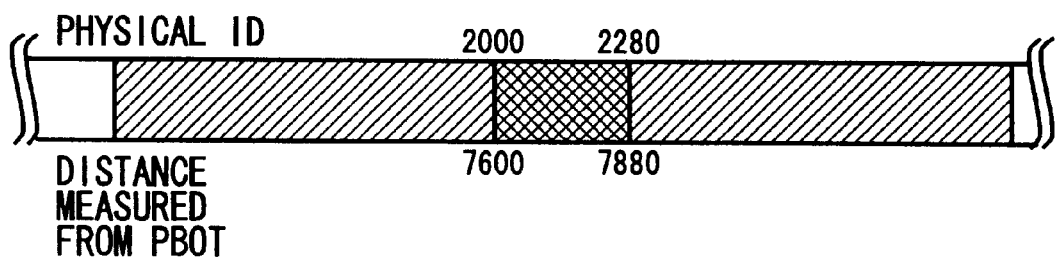

FIG. 25B shows the state of a tape in the case that an error has taken place in a region of a DIT and the above-described retry process has been performed one time. In this case, the start position of the DIT is moved in the direction of the PEOT for 280ID. Thus, the distance measured from the PBOT becomes 7600ID. In addition, the physical ID of the start position of the DIT is increased for 280ID. Thus, the physical ID of the start position of the DIT becomes 200ID. The DIT track that has been written before the retry process has been performed is overwritten with dummy track.

Figure 25C:
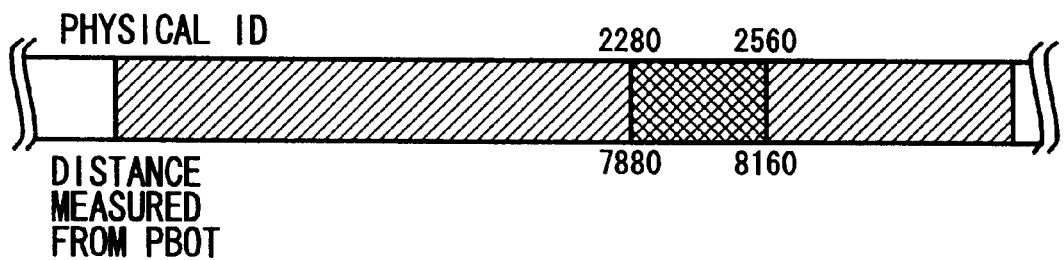

FIG. 25C shows the state of a tape in the case that an error of a DIT track has taken place in a first time retry process and then a second time retry track has been performed. When the second time retry process is performed, the start position of the DIT is moved in the direction of the PEOT for 280ID. Thus, the start position of the new DIT becomes 7880ID measured from the PBOT. In addition, the physical ID of the start position of the DIT is increased for 280ID. Thus, the physical ID becomes 2280ID. As with the first time retry process, the DIT track that has been written before the retry process has been performed is overwritten with a dummy track.

Thus, according to the present invention, when the write retry process for the DIT is performed, the start position of the DIT on the tape is changed. In addition, the physical ID of the start position is changed. Thus, even if an error has taken place in the write process for the DIT due to a scratch on the tape or the like, the DIT can be correctly written by the retry process.

d2. Detailed Description of Process

Next, with reference to the accompanying drawings, a write retry process for a DIT according to the present invention will be described in detail. The write retry process described in this part is applied for the apparatus corresponding to "a. Magnetic tape apparatus according to the present invention" shown in FIGS. 3 and 9.

Figure 26:
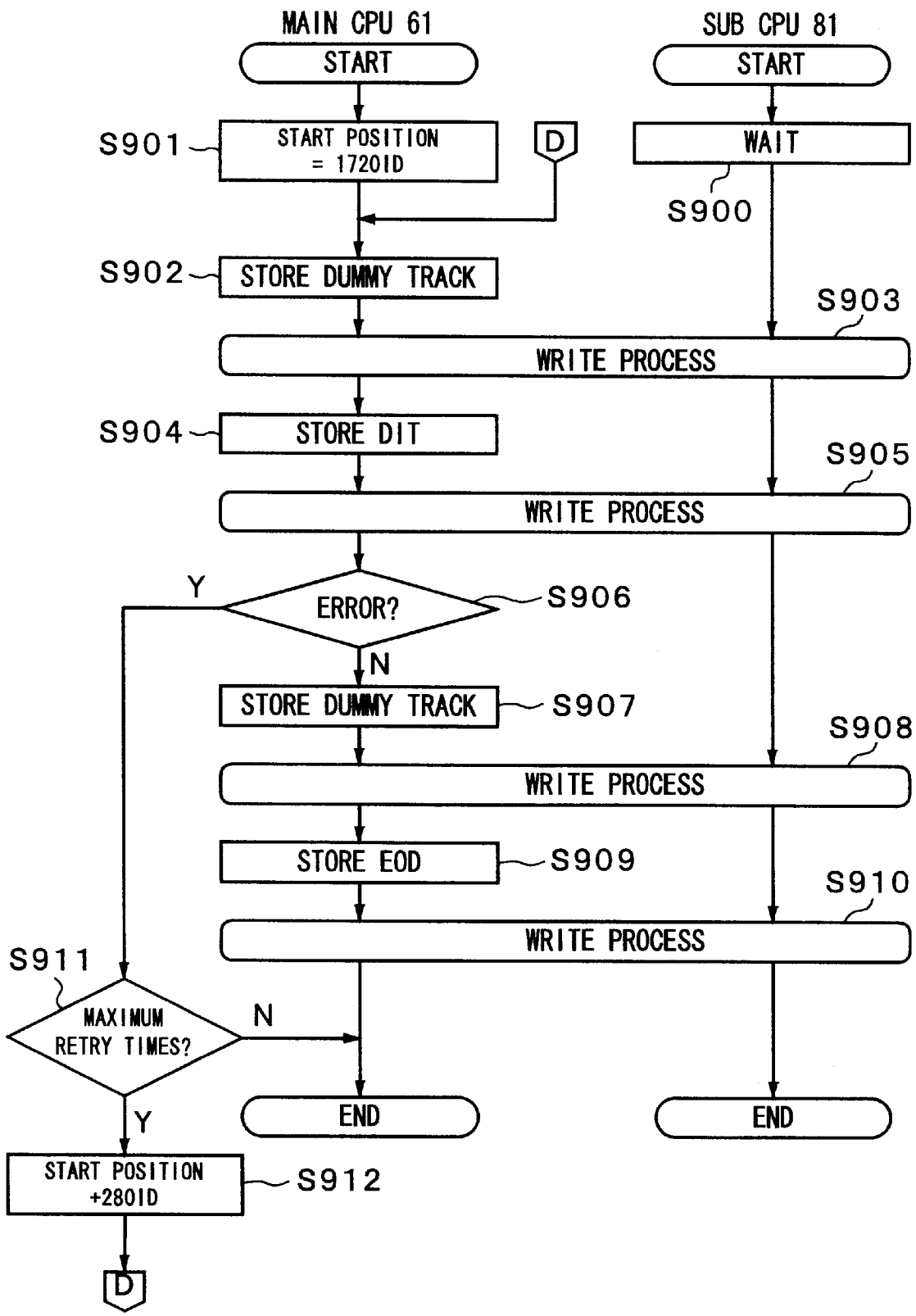
FIG. 26 is a flow chart showing a write process for a DIT including a retry process according to the present invention.

FIG. 26 is a flow chart showing a write process for a DIT including a retry process. In this example, the DIT is used to manage a first partition. The DIT is written just after a VSIT.

First, the sub CPU 81 waits until a command send packet is received from the main CPU 61 (at step S900). At step S901, the main CPU 61 sets the physical ID of the start position of the DIT to 1720ID. The start position of the DIT is stored in a predetermined area of the RAM 71 through the CPU but 62.

At step S902, dummy track data is stored in the bank memory 80. At step S903, the dummy data is written to the tape. At step S903, according to the flow chart shown in FIG. 20, the dummy data is written to the tape. Thus, for prevent redundancy, the detailed description of such a write process is omitted.

The DIT is written just after the VSIT as was described above. Thus, the dummy data is written just after the dummy track of the VSIT. The physical ID of the start position is 700ID. The dummy data is written just before the start position of the current DIT. In this example, since the start position of the DIT is 1720ID, which has been set at step S901, the dummy data is written until 1719ID.

After the dummy track has been written at step S903, the DIT track data is stored in the bank memory 80 (at step S904). At step S905, according to the flow chart shown in FIG. 20, the DIT track data is written to the tape. In this example, the DIT track data with a length of 40ID is repeatedly written seven times to the tape. At step S905, the number of times of the process at step S905 is counted as the write process for the DIT. The count value is stored in a predetermined means such as a RAM.

In the write process for the DIT at step S905, the write result is checked by the read-after-write process. At this point, if an error has taken place, error occurrence status information that represents that an error has taken place is stored in the predetermined storing means such as the RAM.

When the DIT has been written, the flow advances to step S906. At step S906, corresponding to the error occurrence status information stored in the RAM at step S905, it is determined whether or not the write data of the DIT has an error.

When the determined result at step S906 is No (namely, the write data of the DIT does not have an error), the flow advances to step S907. At step S907, dummy track data is stored in the bank memory 80. At step S908, the dummy data is written to the tape corresponding to the flow chart shown in FIG. 20. The dummy data is written just after the DIT track that has been written at step S905 for 600ID. In other words, when the normal write process for the DIT is performed before the retry process, the dummy data is written from 2000ID to 2599ID.

After the dummy data has been written at step S908, the flow advances to step S909. At step S909, EOD data is stored in the bank memory 80. At step S910, the EOD data is written to the tape corresponding to the flow chart shown in FIG. 20. After the EOD data has been written, the write process for the DIT is completed.

Figure 27A:
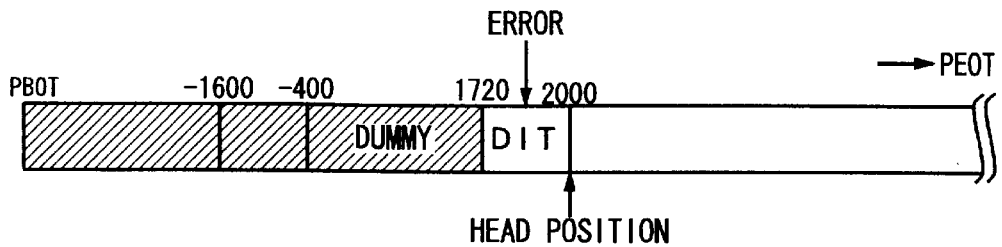
FIGS. 27A–E are digrams to which reference will be made in explaining the relation between a rotating head and a tape at each step in the case that an error has taken place while a write process for a DIT has been performed and a write retry process thereof is performed.

When the determined result at step S906 is Yes (namely, the write data of the DIT has an error), the flow advances to step S911. FIG. 27 shows the relation between the tape and rotating head at each step of the retry process in the case that an error has taken place in a write process for a DIT and then a retry process has been performed. FIG. 27A shows the position of the head in the case that an error has taken place in a DIT.

As described above, in the flow chart showing the write process for the DIT, the number of times of the write process for the DIT at step S905 is counted. As will be described later, the number of times of the write process for the DIT is counted. The upper limit of the number of times of the write process for the DIT (namely, the maximum retry times) has been assigned. At step S911, it is determined whether or not the number of times of the write process becomes the maximum retry times.

When the determined result at step S911 is Yes (namely, the number of times of the retry process becomes the maximum retry times), the tape is treated as an improper tape for use and the write process for the DIT is terminated in the error state. At this point, the user may be informed that this state through the user interface of the apparatus.

On the other hand, when the determined result at step S911 is No (namely, the number of times of the retry process does not become the maximum retry times), the flow advances to step S912. At step S912, the retry process is started. At step S912, the physical ID of the start position of the current DIT is increased for 280ID. In this example, since the start position of the current DIT is 1720ID that has been set at step S901, the start position of the new DIT becomes 1720ID+280ID. Thus, the start position of the new DIT is set to 2000ID. The start position of the new ID T is stored in a predetermined area of the RAM 71. In such a manner, the physical ID of the start position of the DIT is increased for 280ID. The flow returns to step S902.

At step S902, dummy track data is stored in the bank memory 80. At step S903, the dummy data is written to the tape. At step S903, the dummy data is written to the tape corresponding to the flow chart shown in FIG. 20.

Figure 27B:
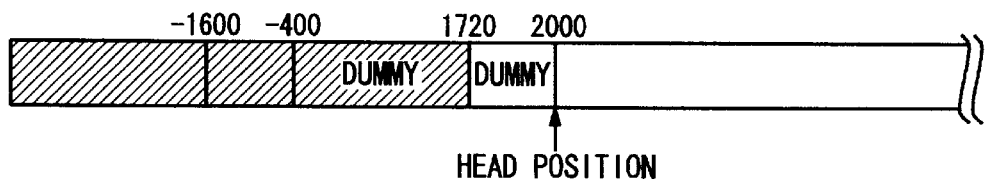

As was described above, the dummy data is written just after the dummy data of the VSIT. The physical ID of the start position of the dummy data becomes 700ID. The dummy data is written just before the start position of the current DIT. At step S912, the start position of the DIT becomes 2000ID of which the start position of the current DIT is increased for 280ID. Thus, the dummy data is written until 1999ID. FIG. 27B shows the position of the head at this point.

Figure 27C:
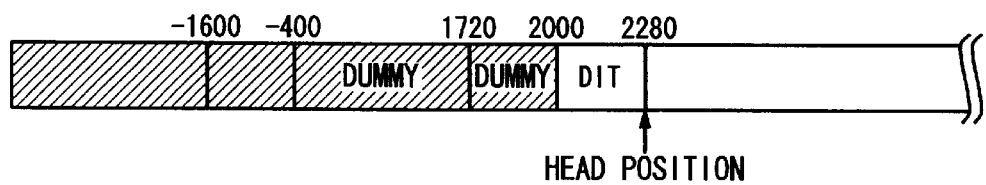

After the dummy data has been written at step S903, the flow advances to step S904. At step S904, DIT track data is stored in the bank memory 80. At step S905, corresponding to the flow chart shown in FIG. 20, the DIT track data is written to the tape at step S905. In this example, the DIT track with a length of 40ID is repeatedly written seven times to the tape. FIG. 27C shows the position of the head at this point. The number of times of the write process for the DIT is counted. The count value stored in the predetermined storing means such as the RAM is increased for 1.

In the write process for the DIT at step S905, the write data is checked by the read-after-write process. At this point, if the write data has an error, error occurrence status information that represents the occurrence of the error is stored in the predetermined storing means such as the RAM.

After the DIT has been written, the flow advances to step S906. At step S906, corresponding to the error occurrence status information stored in the RAM at step S906, it is determined whether or not the write data of the DIT has an error.

Figure 27D:
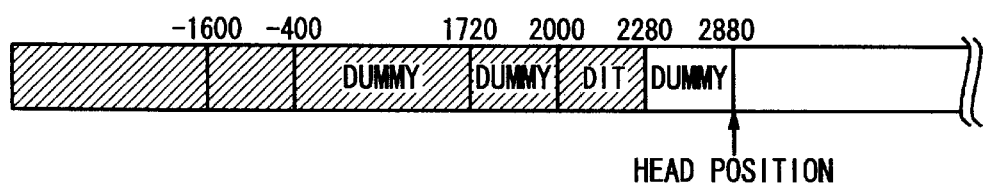

When the determined result at step S906 is No (namely, the write data of the DIT does not have an error), the flow advances to step S907. At step S907, dummy track data is stored in the bank memory 80. At step S908, corresponding to the flow chart shown in FIG. 20, the dummy data is written to the tape. The dummy data is written just after the DIT track that has been written at step S905 for 600ID. In other words, in the first time write retry process for the DIT, the dummy data is written from 2280ID to 2879ID. FIG. 27D shows the position of the head at this point.

Figure 27E:
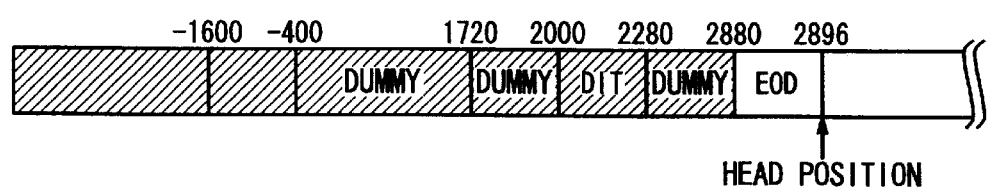

At step S908, when the dummy data has been written, the flow advances to step S909. At step S909, EOD data is stored in the bank memory 80. At step S910, the EOD data is written to the tape corresponding to the flow chart shown in FIG. 20. FIG. 27E shows the position of the head at this point. After the EOD has been written, the write process for the DIT is completed.

When the determined result at step S906 is Yes (namely, the write data of the DIT has an error), the flow advances to step S911. As described above, in the flow chart showing the write process for the DIT, the number of times of the write process for the DIT at step S905 is counted. Whenever the retry process is performed, the number of times of the write process for the DIT is increased. The upper limit of the number of times of the write process for the DIT (namely, the maximum retry times) has been assigned. At step S911, it is determined whether or not the number of times of the write process becomes the maximum retry times.

When the determined result at step S911 is Yes (namely, the number of times of the retry process becomes the maximum retry times), the tape is treated as an improper tape for use and the write process for the DIT is terminated in the error state.

On the other hand, when the determined result at step S911 is No (namely, the number of times of the retry process does not become the maximum retry times), the flow advances to step S912. At step S912, the second time retry process is performed. At step S912, the physical ID of the start position of the DIT that has been set is increased for 280ID. In this case, since the start position of the current DIT is 2000ID that has been set in the first time retry process, the start position 2000ID is increased for 280ID. Thus, the start position of the new DIT becomes 2280ID. The physical ID of the start position of the new DIT is stored in the predetermined area of the RAM 71. Thereafter, the flow returns to step S902. At step S902, the write process for the DIT is started.

The loop process starting after step S702 is performed until the write data of the VSIT does not have an error or the number of times of the retry process becomes the upper limit. Whenever the retry process is performed, the physical ID of the start position of the DIT is increased for 280ID.

e. Examples of Modifications

In this part, examples of modifications of the present invention will be described. In the above-described embodiment, the present invention was applied for the data recorder described in "a. Magnetic tape apparatus according to the present invention." However, the present invention is not limited to such an embodiment. In other words, the present invention is effective for a streamer apparatus having a header area and a data area where the start position of a header area is fixed.

In this case, as an application, an apparatus of which an index is placed in the header area and data is placed in the data area may be considered. In addition, the present invention can be applied for a video library of which a still picture is placed in the header area and a moving picture is place in the data area.

Next, a second modification of the present invention will be described. The present invention is effective for a streamer apparatus having a header area and a data area. In this case, as with the first modification, the present invention can be applied for a database and a video library.

As described above, according to the write retry process for the VSIT of the present invention, the physical ID of the position of the VSIT that is an area for storing the management information of the entire tape is fixed. Thus, the structure of the apparatus becomes more simple than the related art reference.

In the present invention, the physical ID values should be increased from the PBOT side. In other words, as long as the physical ID values simply increase, the increment may be discontinuous. Thus, the structure of the apparatus can be simplified.

In addition, when the write retry process for the VSIT is performed, the position of the tape can be changed without necessity to change the physical ID of the VSIT. Thus, the retry process can be very effectively performed against an error due to a scratch on the tape or the like.

Moreover, although the physical ID of the area of the VSIT is fixed, when an error takes place, the retry process is performed so that the position of the VSIT that is rewritten is changed. Thus, when the retry process is performed against such a defect, both the conditions can be satisfied. In other words, the retry process can be performed so that the physical ID of the VSIT is fixed and the physical ID is simply increased.

Furthermore, according to the present invention, when the write retry process for the DIT is performed against an error by the apparatus according to the present invention, the position at which the new DIT is written is changed. Thus, the present invention is very effective for an error due to a partial defect of the tape.

I claim:

1. A digital data recording/reproducing apparatus for recording/reproducing digital data and header information to/from data and header areas as a plurality of divided areas of a tape shaped record medium with a recording/reproducing head, comprising:

memory means for storing the header information to be recorded on the tape shaped record medium;

error determining means for determining whether or not an error takes place when the header information stored in said memory means is recorded in the header area of the tape shaped record medium and outputting an error occurrence signal when the error takes place; and controlling means for causing dummy data to be recorded at a position where the error exist and for changing the position at which the header information is recorded on the tape shaped record medium when the error occurrence signal is input from said error determining means.

2. The digital data recording/reproducing apparatus as set forth in claim 1, wherein if the error takes place when the header information stored in said memory means is recorded in the header area of the tape shaped record medium, when the error occurrence signal is input from said error determining means, said controlling means performs a control process such that the position of the tape shaped record medium for recording the header information is moved to the tape end side and the header information is recorded thereto.

3. The digital data recording/reproducing apparatus as set forth in claim 1, wherein if the error takes places when the header information stored in said memory means is recorded in the header area of the tape shaped record medium, when the error occurrence signal is input from said error determining means, said controlling means counts the number of times of a process for recording the header information stored in said memory means, if the number of times is a predetermined value, said controlling means does not record the header information, if the number of times is smaller than the predetermined value, said controlling means changes the position at which the header information is recorded on the tape shaped record medium and records the header information to the changed position.

4. The digital data recording/reproducing apparatus as set forth in claim 1, wherein said error determining means reproduces the header information recorded on the tape shaped record medium with the recording/reproducing head and compares the recorded data with the reproduced data so as to determine whether an error takes place.

5. The digital data recording/reproducing apparatus as set forth in claim 1, wherein if the error takes place when the header information stored in said memory means is recorded in the header area of the tape shaped record medium, when the error occurrence signal is input from said error determining means, said controlling means performs a control process such that dummy data is recorded at the position of the error and the position of the tape shaped record medium for recording the header information is moved to the tape end side and the header information is recorded thereto.

6. A digital data recording/reproducing method for recording/reproducing digital data and header information to/from data and header areas as a plurality of divided areas of a tape shaped record medium with a recording/reproducing head, comprising the steps of:

(1) storing the header information to be recorded on the tape shaped record medium;

(2) determining whether or not an error takes place when the header information stored in the step (1) is recorded in the header area of the tape shaped record medium and outputting an error occurrence signal when the error takes place; and (3) causing dummy data to be recorded at a position where the error exist and changing the position at which the header information is recorded on the tape shaped record medium when the error occurrence signal is input in the step (2).

7. The digital data recording/reproducing method as set forth in claim 6, wherein when the error occurrence signal is input in the step (2), the step (3) includes moving the position of the tape shaped record medium for recording the header information to the tape end side and recording the header information thereto.

8. The digital data recording/reproducing method as set forth in claim 6, further comprising the step of counting a process for recording the header information to the header area of the tape shaped record medium, wherein if the number of times is smaller than a predetermined value, the step (3) is executed.

9. A digital recording/reproducing method for recording/reproducing digital data and dummy data/header information to/from data and header areas as a plurality of divided data areas of a tape shaped record medium, comprising the steps of:

(1) recording the dummy data/header information to the header area of the tape shaped record medium;

(2) counting the number of times of a process for recording the dummy data/header information to the tape shaped record medium;

(3) reproducing the header information that has been recorded and comparing the recorded header information with the reproduced header information so as to determine whether the header information has an error; and (4) when it has been determined that the header information on the tape shaped record medium has an error in the step (3), if the number of time of the process counted at the step (2) is smaller than a predetermined value, changing the position of the header information recorded on the tape shaped record medium and recording the header information to the changed position and recording the dummy data at a position where the error exist.

10. The digital data recording/reproducing method as set forth in claim 9, wherein when it has been determined that the header information on the tape shaped record medium has an error in the step (3), if the number of times of the process counted at the step (2) is smaller than a predetermined value, the step (4) includes moving the position at which the header information is recorded on the tape shaped record medium to the tape end side and rewriting the header information to the changed position.

11. The digital data recording/reproducing method as set forth in claim 9, further comprising the step of, if it has been determined that the header information recorded on the tape shaped record medium does not have an error in the step (3), recording the header information and the dummy data on the tape shaped record medium and recording the digital data to the data area of the tape shaped record medium.

12. A digital recording/reproducing method for recording/reproducing digital data and dummy data/header information to/from data and header areas as a plurality of divided data areas of a tape shaped record medium, comprising the steps of:

(1) recording the dummy data/header information to the header area of the tape shaped record medium;

(2) counting the number of times of a process for recording the dummy data/header information to the tape shaped record medium;

(3) reproducing the header information that has been recorded and comparing the recorded header information with the reproduced header information so as to determine whether or not the header information recorded on the tape shaped record medium has an error; and (4) changing the position at which the header information is recorded on tape shaped record medium, wherein if it has been determined that the header information has an error in the step (3) and the count value is smaller than a predetermined value, the step (1) is executed just after the step (4) and such that the dummy data is recorded at a position where the error exist.

13. The digital data recording/reproducing method as set forth in claim 12, wherein the step (4) includes moving the position of the header information on the tape shaped record medium in the tape end direction.

14. The digital data recording/reproducing method as set forth in claim 12, further comprising the step of, if it has been determined that the header information recorded on the tape shaped record medium does not have an error in the step (3), recording the dummy data preceded by the header information in the header area and recording the digital data to the data area.

* * * * *